(12) United States Patent
Oishi et al.

(10) Patent No.: US 7,224,720 B2
(45) Date of Patent: May 29, 2007

(54) CORRELATOR AND DELAY LOCK LOOP CIRCUIT

(75) Inventors: Yasuyuki Oishi, Kawasaki (JP); Kazuo Nagatani, Kawasaki (JP); Hajime Hamada, Kawasaki (JP); Yoshihiko Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 696 days.

(21) Appl. No.: 10/625,337

(22) Filed: Jul. 22, 2003

(65) Prior Publication Data

US 2004/0258138 A1 Dec. 23, 2004

Related U.S. Application Data

(62) Division of application No. 09/318,446, filed on May 25, 1999, now Pat. No. 6,650,689.

(30) Foreign Application Priority Data

Jul. 17, 1998 (JP) ................. 10-203237

(51) Int. Cl.
*H04B 1/69* (2006.01)
*H03D 3/24* (2006.01)

(52) U.S. Cl. ...................... 375/150; 375/376

(58) Field of Classification Search ................ 375/376, 375/150, 373, 375, 327, 294; 342/103; 329/325, 329/360; 327/147, 156
See application file for complete search history.

(56) References Cited

U.S. PATENT DOCUMENTS 4,095,047 A * 6/1978 von Pieverling et al. ... 375/367

| 4,385,401 A | 5/1983 | Jagnow et al. |
| 4,873,699 A | 10/1989 | Saussier et al. |
| 5,043,988 A * | 8/1991 | Brglez et al. ............... 714/739 |
| 5,375,141 A * | 12/1994 | Takahashi .................... 375/149 |
| 5,436,935 A | 7/1995 | Bernhard et al. |
| 5,832,029 A | 11/1998 | Mimura |
| 6,205,167 B1 * | 3/2001 | Kamgar et al. ............. 375/134 |

FOREIGN PATENT DOCUMENTS

EP 0 757 450 2/1997

(Continued)

OTHER PUBLICATIONS

Japanese Patent Office Notice of Rejection from corresponding Japanese application 1998-203237 dated Apr. 4, 2006 with translation.

*Primary Examiner*—Khai Tran
(74) *Attorney, Agent, or Firm*—Katten Muchin Rosenman LLP

(57) ABSTRACT

The present invention reduces the scale of circuitry and shortens the code phase detection time needed to achieve initial synchronization. In a correlator for calculating correlation between a received spreading code contained in a received spread-spectrum signal and a reference spreading code, a combined code generator is included. The combined code generator outputs a combined spreading code by weighting and combining a plurality of phase-shifted reference spreading codes $A_1$–$A_M$. Further, an arithmetic circuit calculates correlation between the received spreading code and the plurality of phase-shifted reference spreading codes simultaneously. A phase detection circuit detects the phase difference between the received spreading code and a reference spreading code, namely the phase of the received spreading code from the results of the arithmetic operation.

3 Claims, 23 Drawing Sheets

FOREIGN PATENT DOCUMENTS

| | | |
|---|---|---|
| JP | 03-094852 | 9/1991 |
| JP | 5-48569 | 2/1993 |
| JP | 5-114896 | 5/1993 |
| JP | 8-51410 | 2/1996 |
| JP | 08-065204 | 3/1996 |
| JP | 8-316878 | 11/1996 |
| JP | 09-055716 | 2/1997 |
| WO | 95/14937 | 6/1995 |
| WO | 99/34529 | 7/1999 |

* cited by examiner

CORRELATOR AND DELAY LOCK LOOP CIRCUIT

This application is a divisional of application Ser. No. 09/318,466, filed May 25, 1999, now U.S. Pat. No. 6,650,689, allowed Jun. 17, 2003.

BACKGROUND OF THE INVENTION

The present invention is directed to a correlator and a delay locked loop circuit. More particularly, to a correlator for detecting the code phase of a spreading code on the transmitting side (i.e., the code phase of the received spreading code) in a case where a direct-sequence spread-spectrum signal is received, and to a delay locked loop (DLL) circuit for maintaining the synchronization between the received spreading code and a reference spreading code.

Direct-sequence code division multiple-access based upon direct-sequence spread-spectrum (DS-SS) modulation has been considered as a wireless access scheme for next-generation digital mobile communications systems. In order to receive a spread-spectrum signal, the code phase of the spreading code on the transmitting side must be detected on the receiving side and a spreading code for despreading purposes must be generated so as to achieve phase synchronization with the spreading code on the transmitting side.

Digital cellular wireless communication systems using DS-CDMA (Direct-Sequence Code Division Multiple-Access) technology have been developed as next-generation mobile communication systems for implementing wireless multimedia communications. In a CDMA digital cellular wireless communications system of this kind, a base station transmits control information and user information after multiplying this information with a spreading code. Individual mobile stations spread and transmit information using a spreading code specified by the base station. In order for a mobile station to correctly receive information such as control information from the base station in a CDMA digital cellular wireless communications system of this kind, it is necessary to identify the timing at which the spread-spectrum modulation starts at the base station, i.e., the phase of the spreading code.

FIG. 19 shows a receiver of a mobile station for a CDMA digital cellular wireless communication system. The receiver includes an antenna 1, a receiver circuit 2 for performing amplification and frequency conversion from RF (radio frequency) to IF (intermediate frequency), a QPSK detector 3 for performing QPSK detection and outputting I, Q signals and an A/D converter 4 for converting baseband analog I, Q signals output from detector 3 to digital I, Q data, a despreading circuit 5 for applying despread processing to the I, Q data output by the A/D converter 4, a data demodulator 6 for performing synchronous detection, data discrimination and error correction, a correlator 7 for performing a correlation operation in order to identify spread start timing (the phase of the received spreading code) and a timing decision unit 8 for identifying spread start timing (phase) from correlation value.

The correlator 7 performs a correlation operation between a received spread-spectrum data sequence and a reference spreading code sequence (a spreading code sequence identical with that on the side of the base station).

As shown in FIG. 20, a spreader 9 on a transmitting side executes spread processing and transmits a signal indicated by:

$$X(t) = a(t) \cdot c(t)$$

Where a(t) represents transmitted data and c(t) a PN (pseudorandom number) sequence.

The PN sequence c(t) is a spreading code sequence of "1"s and "0"s. The same code sequence (a code sequence of N chips) is repeated on a per-symbol basis, wherein one symbol corresponds to one-bit of data.

The signal x(t) is received on the receiving side, where the correlator 7 calculates the correlation between the signal x(t) and a reference spreading code c(t−τ) and outputs a correlation value R(t) indicated by the following equation:

$$R(t) = \Sigma x(t) \cdot c(t - \tau)$$
$$= \Sigma a(t) \cdot c(t) \cdot c(t - \tau), t = Tc, 2Tc, \cdots N \cdot Tc$$

where τ represents a code shift (phase difference) between the spreading code on the transmitting side and the reference spreading code of the correlator on the receiving side. The integration interval is the duration of one symbol (the time period of N chips, which is equal to N·Tc).

If "a(t)=1" holds in the above equation, the correlation value R(t) will indicate the auto correlation value of the PN sequence. If the PN sequence is an M sequence, R(t)=N (1 when normalized) is obtained as a maximum at τ=0 and R(t)=1/N holds at τ≠0. In actuality, a(t) is unknown and may be "1" or "0". However, by assuming for example that "1"=−1 and "0"1, and integrating the absolute value of a(t)·c(t)·c(t−τ), R(t)=1 is obtained at τ=0 and R(t)=1/N at τ≠0.

Thus, by calculating correlation values while changing the phase of the reference spreading code c(t−τ) one chip width Tc at a time and detecting the timing at which the correlation value exceeds a set level, it is possible to identify the spread start timing on the transmitting side (the phase of the spreading code on the transmitting side). Accordingly, the timing decision unit 8 of FIG. 19 acquires the spread start timing (phase) based upon the timing at which the correlation value output by the correlator 7 exceeds the set level and inputs this timing to the despreader circuit 5.

A matched filter and a sliding correlator are available as the principal correlation detection techniques applied to DS-SS signals.

FIG. 21 shows a matched filter 71. The matched filter includes an N-chip shift register ($s_1$–$s_N$) 71a for successively shifting the received spread-spectrum data sequence of the baseband (the output of the A/D converter in FIG. 19) at the chip frequency. Also included is an N-chip shift register ($c_1$–$c_N$) 71b for storing the reference spreading code sequence, N-number of multiplying corresponding bits of the baseband spread-spectrum data sequence and reference spreading code sequence. An adder circuit 71d is further included for adding the outputs of the multipliers and a PN generator 71e for generating the PN sequence (the reference spreading code sequence).

The reference spreading code sequence is composed of N chips. The matched filter 71 outputs one correlation value R(t) per chip period Tc and then successively outputs a correlation value every time the phase of the baseband spread-spectrum data sequence changes by one chip width Tc. The matched filter thus outputs correlation values of N-number of different phases over the period of one symbol.

The timing decision unit 8 monitors the correlation value R(t) output by the matched filter 71, determines whether the correlation value has exceeded the set level and identifies the start of the spreading code sequence on the transmitting side (spread start timing) when the correlation value exceeds the set level.

FIG. 22 shows a sliding correlator 72, which includes a PN generator 72a for generating a PN sequence (reference spreading code sequence). The reference spreading code sequence is composed of N chips and is generated cyclically at the symbol period T (=N×Tc). Further, multiplier 72b multiples the baseband spread-spectrum data sequence (the received signal) by the reference spreading code sequence chip by chip and outputs the result.

An integrator 72c integrates N chips of the output of multiplier 72b and outputs the correlation value R(t). The integrator 72c includes an adder 73 for adding the output of the multiplier 72b and the current integrated value, and a delay circuit 74 for outputting the integrated value from adder 73 upon delaying the value by one chip period.

The sliding correlator 72 outputs one correlation value R(t) in one symbol period (the period of N chips) and shifts the phase of the reference spreading code by one chip every symbol, thereby outputting correlation values of N-number of different phases over the period of N symbols (=$N^2 \cdot Tc$).

The timing decision unit 8 monitors the correlation value R(t) output by the sliding correlator 72 to determine whether the correlation value has exceeded the set level. Further, the timing decision unit shifts the phase of the reference spreading code if the correlation value is less than the set level and identifies the start of the spreading code sequence on the transmitting side when the correlation value exceeds the set level.

Thus, the phase of the spreading code on the transmitting side can be detected at a precision of within one chip by the matched filter or sliding correlator. (This is referred to as "synchronization acquisition".) This is followed by performing despreading by generating the spreading code sequence in sync with the detected phase to despread on the receiving side.

However, if no further action is taken once synchronization has been acquired, the synchronizing position will be lost owing to the effects of modulation and noise. This makes it necessary to exercise control in such a manner that the spreading code sequence on the receiving side will not develop a time shift with respect to a received signal for which synchronization has been acquired. (This is referred to as "synchronization tracking".) A DLL (Delay Locked Loop) is known as such a synchronization tracking circuit.

FIG. 23 shows a DLL circuit, which includes a PN generator 9a that generates a first PN sequence (the reference spreading code). The PN generator 9a has nine delay circuits D1–D9 and an Ex-OR gate provided at the input of the fourth delay circuit. This configuration outputs a PN sequence of an M sequence in accordance with $X^9+X^4+1$. The first PN sequence $A_1$ is composed of N chips (=$2^9$=512) and is generated cyclically at the symbol period T (=N×Tc).

A delay circuit 9b delays the first PN sequence (reference spreading code) $A_1$ by one chip and outputs a second PN sequence $A_2$. A multiplier 9c multiplies, chip by chip, the first PN sequence $A_1$ output by the PN generator 9a and a received spread-spectrum data sequence B. A multiplier 9d multiplies, chip by chip, the second PN sequence A2 delayed by one chip and the received spread-spectrum data sequence B.

Further, an adder 9e adds the output of the multiplier 9c and a signal obtained by inverting the code output by the multiplier 9d. The output of the adder 9e is input to a low-pass filter 9f, the output whereof is applied to a voltage-controlled oscillator (VCO) 9g, which varies the clock frequency (chip frequency) based upon the output of the low-pass filter.

The multiplier 9c and low-pass filter 9f function to calculate the correlation between the first PN sequence $A_1$ and the received spread-spectrum data sequence B. If the phase of the first PN sequence and the phase of the received spread-spectrum data sequence match, the maximum output is obtained.

As shown in (a) of FIG. 24, a correlation value R(τ)=1 having the width of one chip is output every symbol. If the phase shifts by the width of one chip or more, the correlation value R(τ) becomes 1/N.

The multiplier 9d and low-pass filter 9f function to calculate the correlation between the second PN sequence $A_2$ delayed by one chip width and the received spread-spectrum data sequence B. If the phase of the second PN sequence and the phase of the received spread-spectrum data sequence match, the maximum output is obtained and a correlation value R(τ) is output, as shown in (b) of FIG. 24. If the phase shifts by the width of one chip or more, the correlation value R(τ) becomes 1/N. The adder 9e adds the output of the multiplier 9c and a signal obtained by inverting the output of the multiplier 9d. As a result, a signal having an S-curve characteristic shown in (c) of FIG. 24 with respect to a phase difference τ is output via the low-pass filter 9f.

On the basis of the output of the low-pass filter, the voltage-controlled oscillator 9g controls the clock frequency in such a manner that the phase difference τ becomes zero. For example, if the phase of the PN sequence (reference spreading code) leads that of the received spreading code, control is performed so as to make the phase difference zero by lowering the clock frequency. If the phase of the PN sequence (reference spreading code) lags behind that of the received spreading code, control is performed so as to make the phase difference zero by raising the clock frequency.

Thus, the phase of the spreading code sequence on the transmitting side is detected (synchronization acquisition) at a precision of within one chip by the correlator (the matched filter of FIG. 21 or sliding correlator of FIG. 22), and then synchronization tracking is carried out by the DLL circuit.

FIG. 25 shows another example of a DLL circuit. In particular, FIG. 25a shows a DLL circuit having a configuration similar to FIG. 23. FIG. 25(b) shows a configuration of another DLL circuit obtained by modifying the DLL circuit of FIG. 25(a). Since multiplication by the PN code and adding the results of multiplication are linear operations, the operations can be interchanged in terms of their order. Accordingly, the DLL circuit of FIG. 25a provides an equivalent function even if the adjacent first and second PN code sequences are multiplied by +1 and −1 by multipliers 9h, 9I, respectively. Further, the products are added by an adder 9j and the received signal is multiplied by the value of the sum, as shown in FIG. 25(b).

The time needed to detect a code phase, the scale of the circuitry and the power consumption associated with the matched filter are compared with those associated with the sliding correlator, the following results are obtained:

(1) If the code length for obtaining correlation is N chips, the code phase detection time required for initial synchronization of reception will be N chips (=N·Tc) in case of the matched filter and $N^2$ chips (=$N^2 \cdot Tc$) in case of the sliding correlator. In other words, the matched filter requires less time to detect the code phase, namely 1/N of the time required in case of the sliding correlator.

(2) The scale of the circuitry in a case where the correlator is implemented by digital processing is understood from FIGS. 21 and 22. Specifically, the matched filter requires two shift registers each having a length equivalent to the number of taps (=N), multipliers equivalent to the number of taps and one cumulative adder. The sliding correlator, on the other hand, requires only one multiplier and one cumulative adder. Therefore, the scale of the hardware of the matched filter is much greater than that of the sliding correlator.

(3) The power consumption of the circuitry is considered to be proportional to the product of the number of gates used and the operating frequency based on the assumption that CMOS LSI circuitry is used. The operating frequency is the chip frequency or the over-sampling frequency of the chip in the case of both the matched filter and sliding correlator. Power consumption, therefore, is considered to be proportional to the scale of the circuitry. Accordingly, the power consumed by the matched filter is much greater than that by the sliding correlator.

Although the matched filter is advantageous in that code phase detection time is short, the scale of the circuitry is very large. A problem that arises, therefore, is that a matched filter cannot be used in a mobile station, which requires low power consumption. The sliding correlator, on the other hand, has the advantage of small-scale circuitry. However, since code phase detection time is long, achieving initial synchronization in the demodulation operation takes time which causes degradation of the system characteristics.

Further, with the conventional DLL circuit, the phase synchronization acquisition range (i.e., the lock range) is small, namely the width of one chip or −Tc/2 to Tc/2, as is evident from FIG. 24(c). However, a problem that arises is that synchronization tracking can no longer be performed if a phase shift in excess of one chip occurs.

SUMMARY OF THE INVENTION

An object of the present invention is to provide a correlator having circuitry of a smaller scale, which also makes it possible to shorten code phase detection time required for initial synchronization.

Another object of the present invention is to provide a DLL circuit that makes it possible to enlarge the phase synchronization acquisition range.

These and other objects are met by a correlator according to the present invention for calculating correlation between a received spreading code contained in a received spread-spectrum signal and a reference spreading code. The correlation detection is performed using a combined spreading code obtained by weighting and combining a plurality (M-number) of phase-shifted reference spreading codes. A phase difference between the received spreading code and the reference spreading code (namely the phase of the received spreading code) is detected based upon the result of correlation detection (i.e., the correlation value).

The correlation detection using the combined spreading code provides a response of a linear sum of correlation outputs with respect to the plurality (M-number) of code phases in the spreading code phase space in a single correlation operation. The response can be designed based upon the weighting function of the combined spreading code.

A correlator that discriminates an area in which a code phase resides and a correlator that uniquely decides code phase can be realized by employing the above property. Phase detection time of the correlator according to the present invention is 1/M that of a sliding correlator. Moreover, the scale of the circuitry is determined by adding a code combining circuit and phase discrimination circuit onto a sliding correlator, which is much smaller in scale than that of a matched filter.

Further, a correlator according to the present invention calculates a correlation between a received spreading code contained in a received spread-spectrum signal and a reference spreading code. This enables the phase of the received spreading code to be detected using first and second combined spreading codes obtained by applying first and second weighting to each of a plurality of phase-shifted reference spreading codes and then combining the weighted codes.

For example, a first combined spreading code is generated by weighting each of the phase-shifted reference spreading codes by values obtained by sampling one period of a sine-wave signal in phase-shift units and a second combined spreading code is generated by weighting each of the phase-shifted reference spreading codes by values obtained by sampling one period of a cosine-wave signal in phase-shift units. Thus, a phase difference between the received spreading code and reference spreading code (namely the phase of the received spreading code) is detected using the first and second combined spreading codes. If this arrangement is adopted, the phase of the received spreading code can be detected correctly even if the reception level changes.

Further, a code phase is detected accurately by enlarging the units in which the phase shift is made, obtaining the phase of the received spreading code at these phase-shift units and then sequentially searching the phase area in the phase-shift units obtained using a sliding correlator, for example. If this arrangement is adopted, the code phase can be detected by a small number of correlation operations.

Further, a correlator according to the present invention a correlation between a received spreading code contained in a received spread-spectrum signal and a reference spreading code is calculated. A phase area in which a phase difference between the received spreading code and reference spreading code (namely the phase of the received spreading code) belongs is discriminated using a combined spreading code. The combined spreading code is obtained by weighting and combining a plurality of phase-shifted reference spreading codes. Further, the weighting is changed and a smaller phase area to which a code phase belongs is discriminated, and the phase area is narrowed down by repeating these discrimination operations.

For example, the phase area is divided into first and second areas. The phase area in which a code phase belongs is identified by discriminating the sign of a correlation value. The correlation value is obtained by the weight of a reference spreading code for which the amount of phase shift resides in the first phase area is +w (where w is an integer) and the weight of a reference spreading code for which the amount of phase shift resides in the second phase area is made −w. The identified phase area is then divided further into two area and similar weighting and discrimination operations are performed to narrow down the phase area. Thus, the phase of the received spreading code is detected by subsequently repeating weighting and discrimination. If this arrangement is adopted, the scanning of all code phases of N chips is completed by performing $\log_2 N$-number of correlation operations.

In a delay locked loop circuit that maintains phase synchronization between a received spreading code contained in a received spread-spectrum signal and a reference spreading code according to the present invention, a phase difference between the received spreading code and the reference spread code is detected using a combined spreading code. The combined spreading code is obtained by weighting and combining a plurality of phase-shifted reference spreading codes. Further, the phase of the reference spreading code is controlled based upon the phase difference.

For example, among 2n (where n is a positive integer) sequentially phase-shifted reference spreading codes, the weight of the n reference spreading codes of the first half in which the amount of phase shift is small is taken as being positive and the amount of weighting is successively reduced. The weight of the n reference spreading codes of the second half in which the amount of phase shift is large is taken as being negative and the amount of weighting is successively enlarged. Thereby generating a combined spreading code, where the phase difference is detected using this combined spreading code, and the phase of the reference spreading code is controlled based upon the phase difference. By performing phase difference detection using the combined spreading code and controlling the phase of the reference spreading code based upon the phase difference, the phase synchronization acquisition range of the DLL is enlarged to a code length of N chips. This enables initial synchronization to be achieved more in a shorter period of time.

Further, a plurality of weights in which n is different are prepared. A combined spreading code is output initially using weights for which n is large and a combined spreading code is subsequently output using weights for which n is small whenever the phase difference between the first-mentioned combined spreading code and received spreading code falls below a set value. If this arrangement is adopted, the loop gain of the DLL circuit with respect to the phase difference is raised while narrowing the lock range, thereby making it possible to improve the characteristic of the DLL.

DETAILED DESCRIPTION (A) Correlator (a) First Embodiment of Correlator

Figure 1:
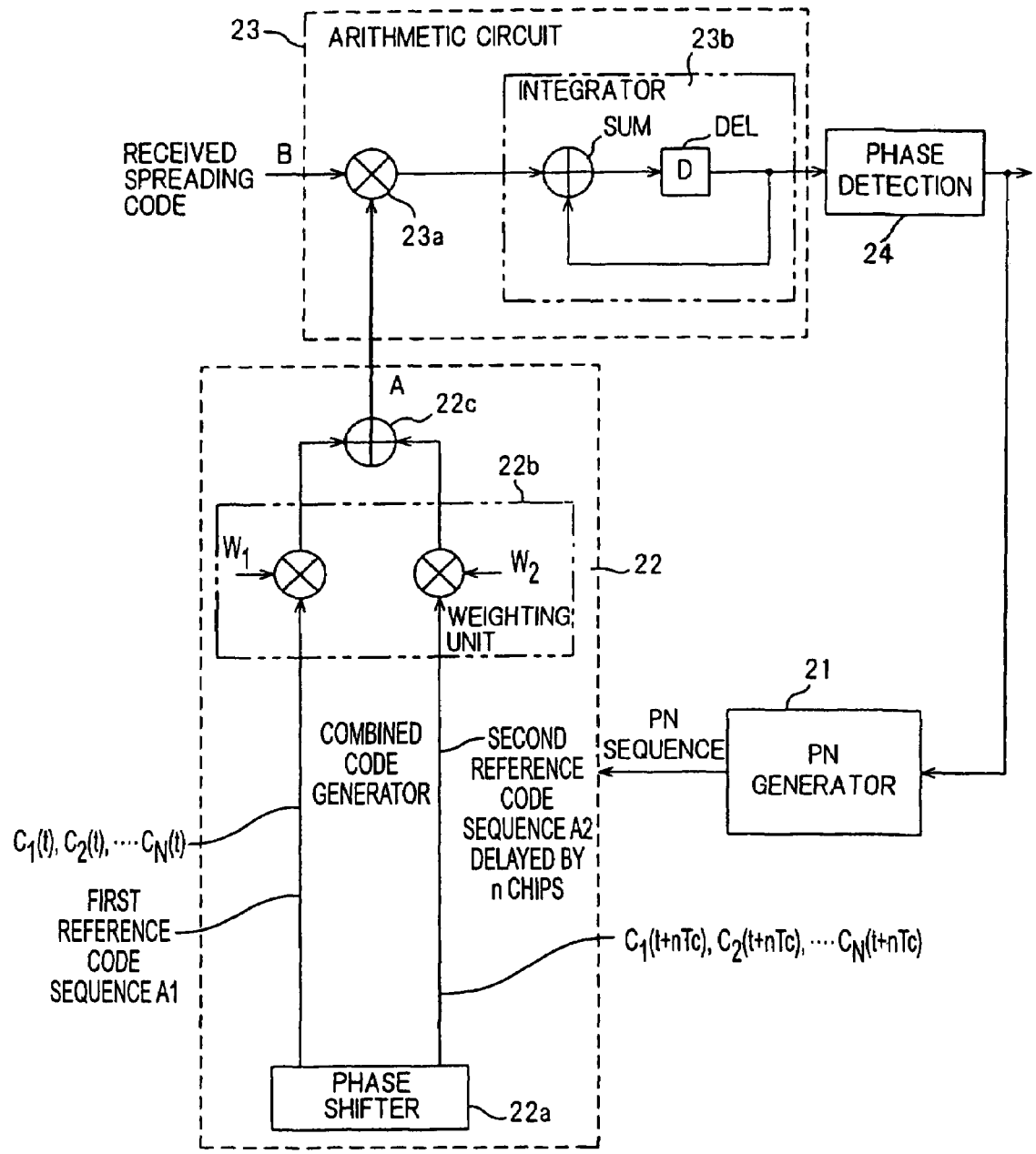
FIG. 1 is a diagram showing a first embodiment of a correlator according to the present invention.

FIG. 1 shows a first embodiment of a correlator according to the present invention. The correlator of FIG. 1 calculates the correlation between a received spreading code contained in a received spread-spectrum signal and a reference spreading code.

Reference numeral 21 designates a PN sequence generator for cyclically generating a PN sequence (a reference spreading code) as an M sequence. The PN sequence has a code length of N chips, where the chip width is Tc. The code period (N·Tc) of the PN sequence is equal to one symbol period (one bit interval) T. A combined code generator 22 weights and combines a plurality of (two in the illustration) of phase-shifted reference spreading code sequences, namely first and second reference spreading code sequences $A_1$ and $A_2$. An arithmetic circuit 23 calculates the correlation between a combined spreading code A and a received spreading code B. A phase detection circuit 24 detects the phase difference between the received spreading code and the reference spreading code (namely the phase of the received spreading code) on the basis of the output level of the arithmetic circuit.

The combined code generator 22 includes a phase shift circuit 22a for outputting the first reference spreading code $A_1$: $C_1(t), C_2(t), \ldots, C_N(t)$ and the second spreading code $A_2$: $C_1(t+n·Tc), C_2(t+n·Tc), \ldots, C_N(t+n·Tc)$. The first reference spreading code $A_1$ has not been delayed, while the second reference spreading code $A_2$ has been delayed by a time equivalent to n chips (=n·Tc). The combined code generator includes a weighting circuit 22b for weighting the first and second reference spreading codes $A_1$, $A_2$ by weights $W_1$, $W_2$ ($W_1 > W_2$), respectively, and a combining circuit 22c for combining the weighted first and second reference spreading codes to output the combined spreading code. It should be noted that n=N/2.

The arithmetic circuit 23 has a multiplication circuit 23a that multiplies the received spreading code B by the combined spreading code A, one chip at a time at the chip period. Further, an integrator 23b adds the results of multiplication N times and then outputs the result. The integrator 23b has an adder SUM that adds the output of the multiplication circuit 23a and the currently prevailing integrated value. A delay line DEL then outputs the integrated value, which is the output of the adder, upon delaying the integrated value by one chip width Tc.

Figure 22:
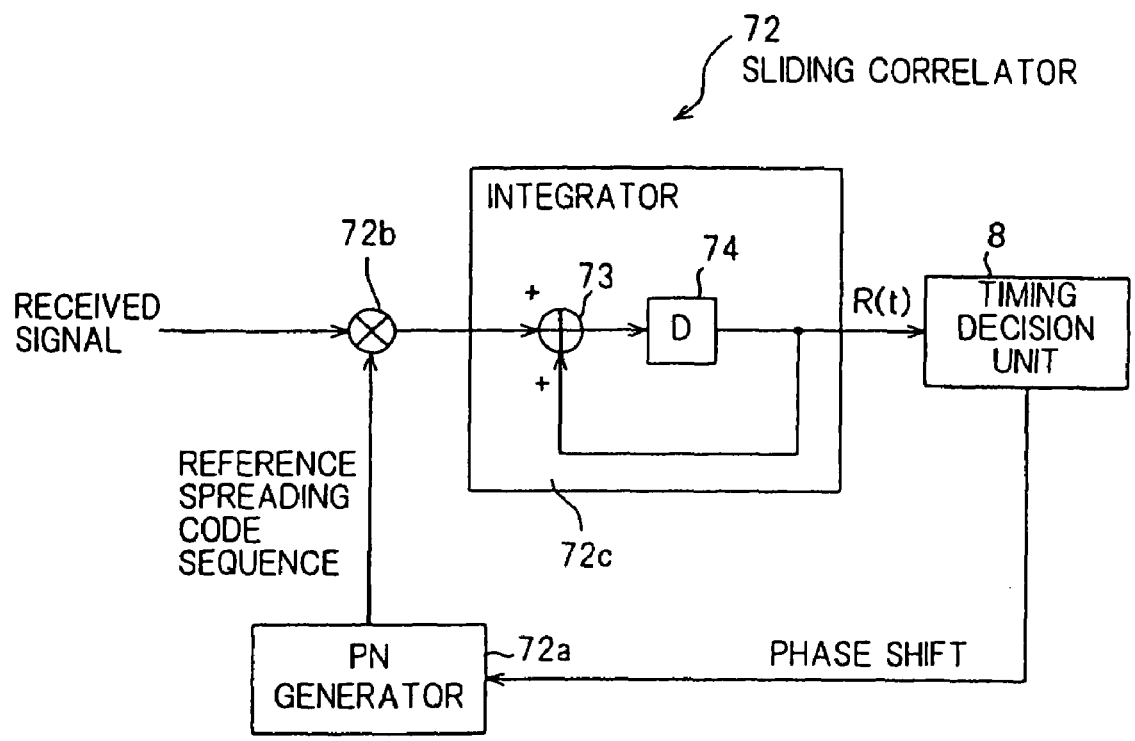
FIG. 22 is a diagram showing a sliding correlator.
Figure 23:
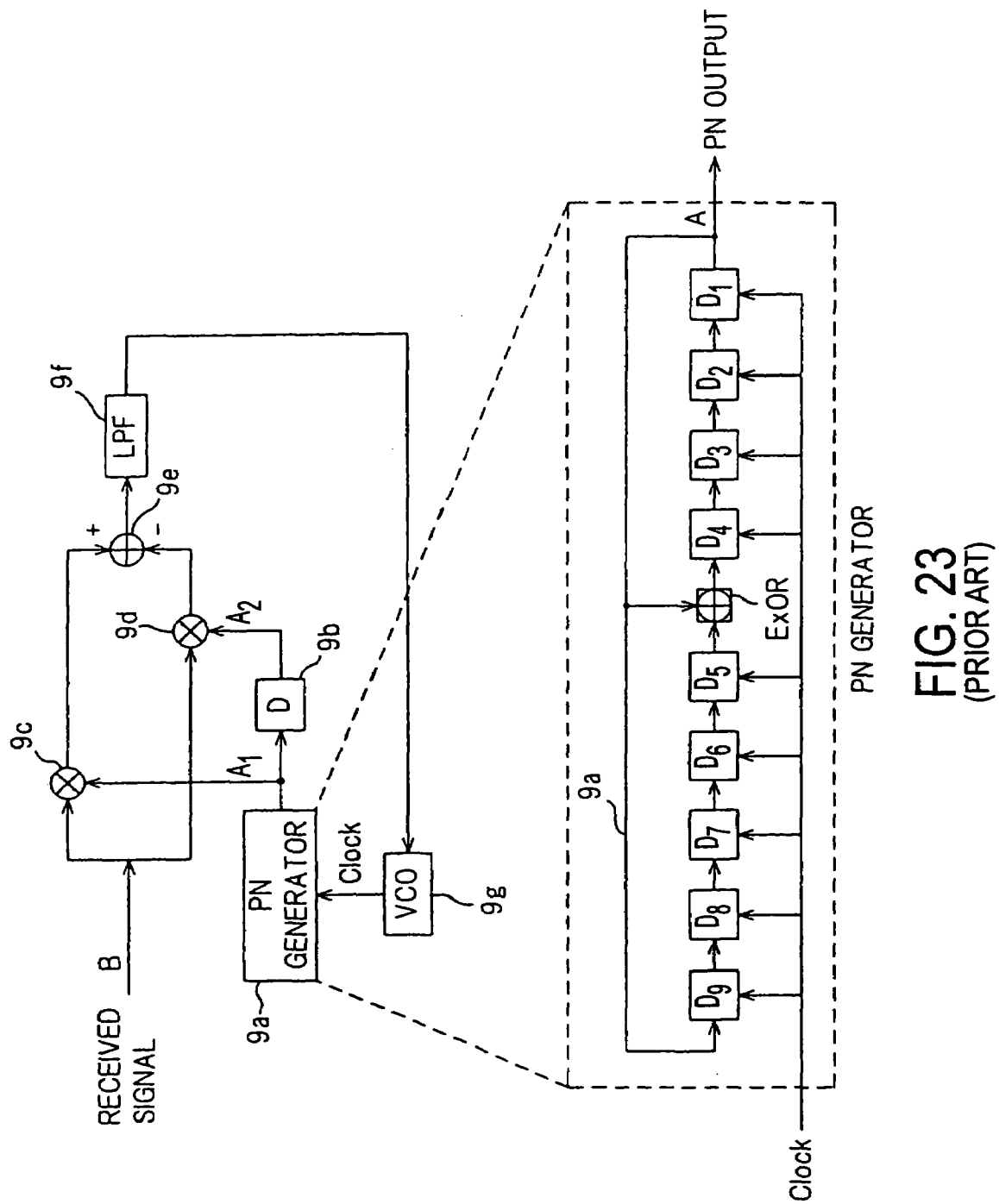
FIG. 23 is a diagram showing a conventional DLL circuit.
Figure 24A:
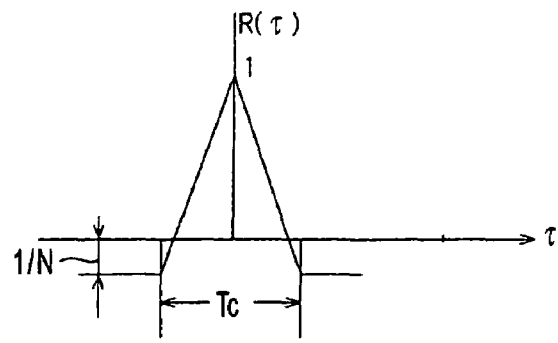
FIG. 24 is a diagram illustrating the S-curve of a DLL circuit.
Figure 24B:
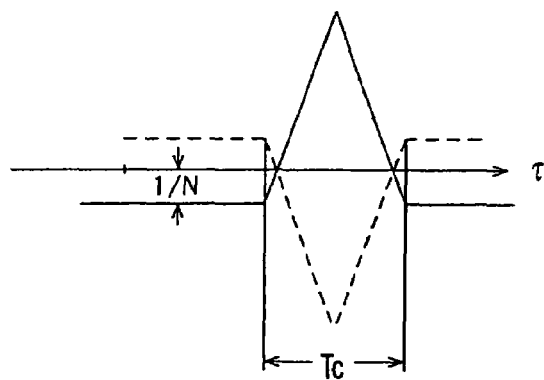
Figure 24C:
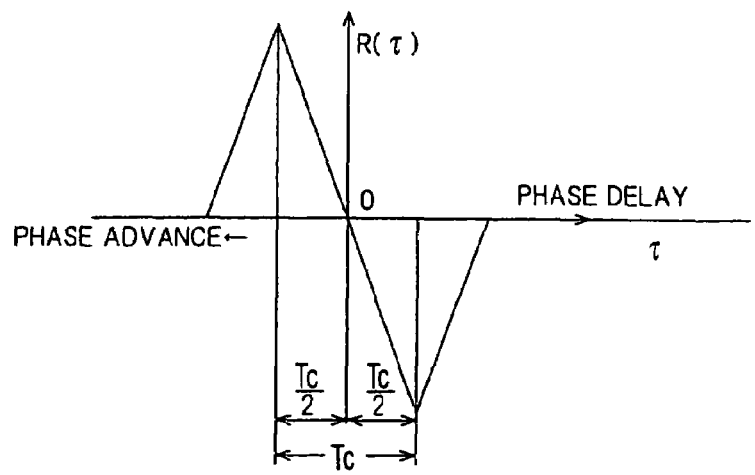

The correlator of the first embodiment is obtained by providing the conventional sliding integrator described in regard to FIG. 22 with the phase shifter 22a, weighting unit 22b and combiner 22c. If the second reference spreading code $A_2$ is assumed to be 0, then the correlator becomes a sliding correlator similar to that of the prior art.

Figure 2A:
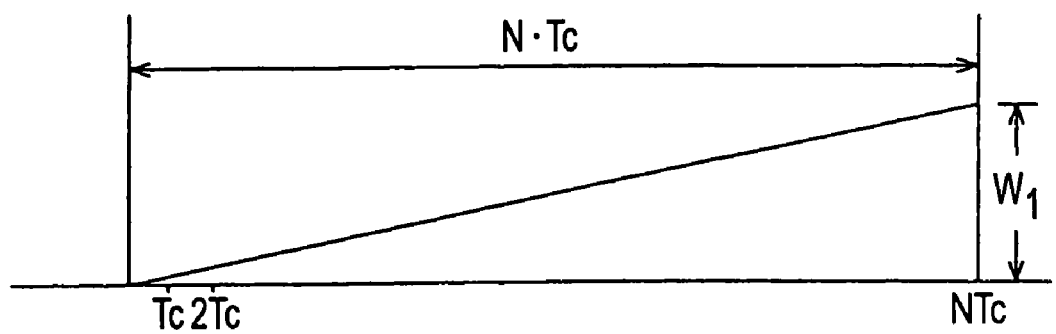
FIG. 2 is a diagram illustrating the operation of the correlator of FIG. 1.
Figure 2B:
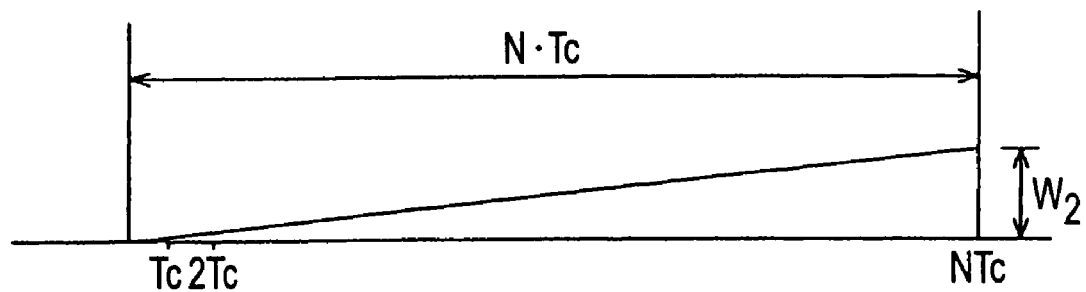

If the phases of the first reference spreading code $A_1$ and received spreading code B match, the arithmetic circuit 23 outputs the signal shown in (a) of FIG. 2. After integration has been performed N times, the arithmetic circuit 23 outputs a correlation value of level $W_1$ (=N·$W_1$). Similarly, if the first reference spreading code $A_1$ is assumed to be 0 and, the phases of the second reference spreading code $A_2$ and received spreading code B match, the arithmetic circuit 23 outputs the signal shown in (b) of FIG. 2. After integration has been performed N times, the arithmetic circuit 23 outputs a correlation value of level $W_2$ (=N·$W_2$).

In actuality, the first and second reference spreading codes $A_1$, $A_2$ are not 0. However, the phases of the first and second references spreading codes $A_1$, $A_2$ do not coincide with the phase of the received spreading code B simultaneously. Accordingly, the phase detection circuit 24 monitors the correlation level (the correlation value of one period of the reference spreading code) that prevails after N additions and (1) decides that the phase of the received spreading code matches the phase of the first reference spreading code $A_1$ if the correlation level is $W_1$. Further, the phase detection circuit 24 (2) decides that the phase of the received spreading code matches the phase of the second reference spreading code $A_2$ if the correlation level is $W_2$ and (3) decides that the phase of the received spreading code does not match the phases of the first and second reference spreading codes if the correlation level is zero.

In case of (3) described above, the phase detection circuit 24 delays, by one chip, the phase of the next period of the PN sequence output by the PN sequence generator 21. The phase detection circuit 24 then repeats the operation described above. If the correlation level becomes $W_1$ while the PN sequence generator 21 is outputting a reference spreading code having a phase delayed by m chips, the phase detection circuit 24 judges that the phase difference between the received spreading code and the reference spreading code in m·Tc. If the correlation level becomes $W_2$, then the phase detection circuit 24 judges that the phase difference between the received spreading code and the reference spreading code is (m+n)·Tc.

If the correlation is calculated between the received spreading code B and the combined spreading code A, which is obtained by combining two reference spreading codes $A_1$, $A_2$ delayed in phase as set forth above, the time needed for phase detection is $N^2/2$ chips (=$N^2$·Tc/2). Therefore, the time required for detection is shortened to half that of the conventional sliding correlator.

(b) Generalized Configuration

The first embodiment of the correlator according to the present invention relates to a case where two reference spreading codes $A_1$, $A_2$ delayed in phase are combined upon being weighted by weights $w_1$, $w_2$, respectively. Thus, the correlation between the combined spreading code and reference spreading code is calculated. If an arrangement is adopted in which this approach is expanded to combine M-number of phase-delayed reference spreading codes $A_1$–$A_M$ weighted by weight $w_1$–$w_M$, respectively, to calculate the correlation between the combined spreading code and the received spreading code, then the time needed to detect phase can be shortened to $N^2$·Tc/M.

Figure 3:
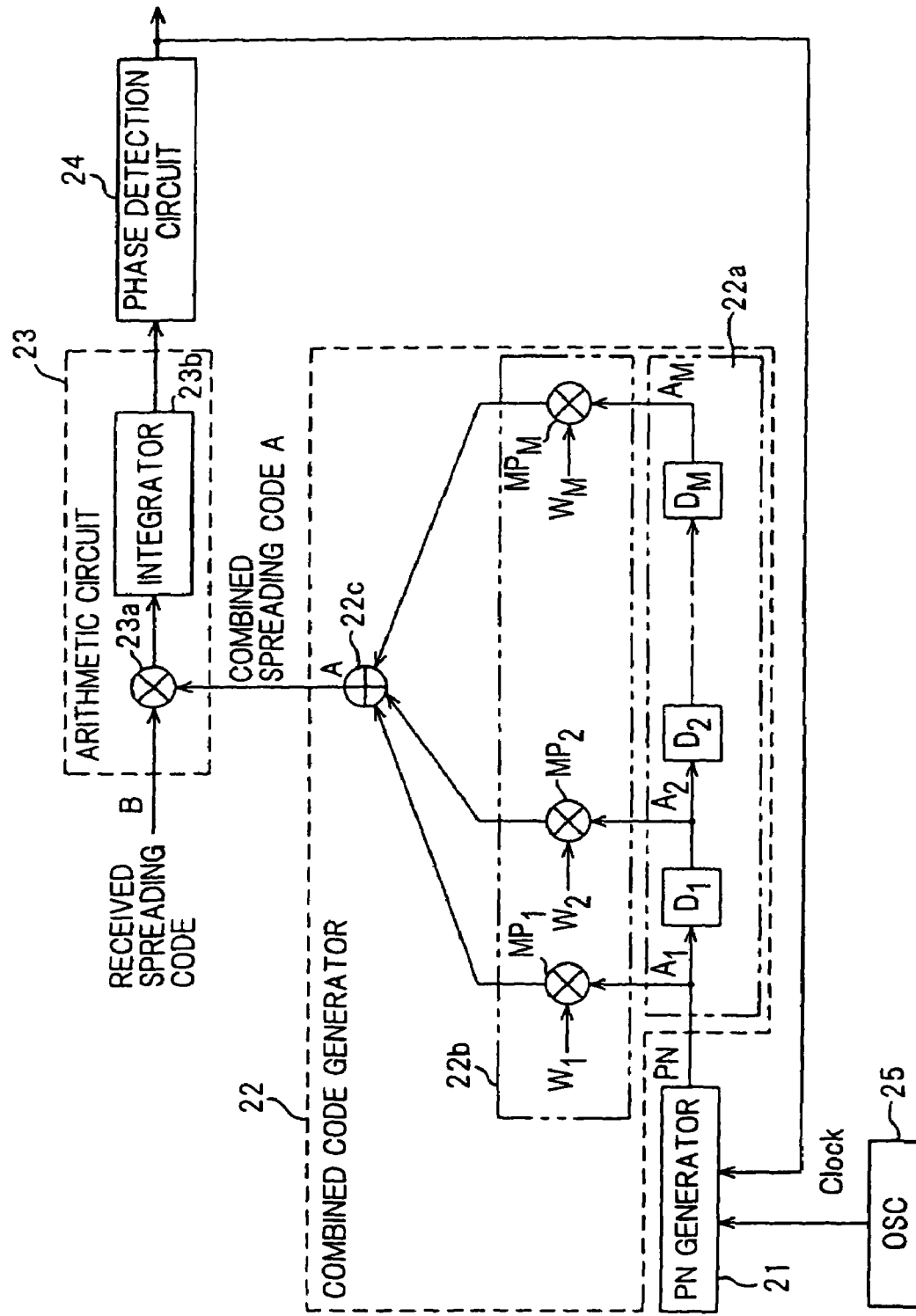
FIG. 3 is a diagram showing a generalized configuration of the correlator of FIG. 1.

In view of the above, FIG. 3 shows a generalized configuration of the correlator according to the present invention, in which components identical with those of FIG. 1 are designated by like reference characters. Shown here are the PN sequence generator 21, the combined code generator 22, the arithmetic circuit 23, the phase detection circuit 24 and an oscillator 25 for outputting a clock having the chip frequency.

The combined code generator 22 includes the phase shift circuit 22a, the weighting circuit 22b and the combining circuit 22c. The phase shift circuit 22a has delay elements $D_1$–$D_M$ each of which successively delays the PN sequence, which is the reference spreading code, by (N·Tc/M). The weighting circuit 22b includes multiplication circuits $MP_1$–$MP_M$ for weighting the $1^{st}$ through Mth reference spreading codes $A_1$–$A_M$, which are output by the phase shift circuit, by weights $w_1$–$w_M$ ($w_1$>$w_2$> . . . >$w_M$), respectively. The combining circuit 22c combines the weighted $1^{st}$–Mth reference codes and outputs the combined spreading code A.

The arithmetic circuit 23 includes the multiplication circuit 23a for multiplying the received spreading code B and the combined spreading code A at the chip period. Further, the integrator 23b adds the results of multiplication N times and outputs the result.

The phase detection circuit 24 monitors the correlation level (the correlation value of one period of the reference spreading code) that prevails after N additions. Further, the phase detection circuit 24 (1) decides that the phase of the received spreading code matches the phase of the first reference spreading code $A_1$ if the correlation level is $W_1$, (2) decides that the phase of the received spreading code matches the phase of the second reference spreading code $A_2$ if the correlation level is $W_2$; . . . , (3) decides that the phase of the received spreading code matches the phase of the Mth reference spreading code $A_M$ if the correlation level is $W_M$ and (4) decides that the phase of the received spreading code does not match the phases of the $1^{st}$ through Mth reference code sequences if the correlation level is zero.

In case of (4) above, the phase detection circuit 24 delays, by one chip width Tc, the phase of the next period of the reference spreading code (PN sequence) output by the PN sequence generator 21. The phase detection circuit 24 then repeats the operation described above. If the correlation level becomes $W_1$ while the PN sequence generator 21 is outputting a reference spreading code (PN sequence) having a phase delayed by m chips, the phase detection circuit 24 judges that the phase difference between the received spreading code and the reference spreading code is m·Tc. If the correlation level becomes $W_2$, the phase detection circuit 24 judges that the phase difference between the received spreading code and the reference spreading code is [m+(N/M)]·Tc. Further, if the correlation level becomes $W_3$, the phase detection circuit 24 judges that the phase difference between the received spreading code and the reference spreading code is [m+(2N/M)]·Tc; . . . . If the correlation level becomes $W_M$, the phase detection circuit 24 judges that the phase difference between the received spreading code and the reference spreading code is [m+(M−1)·N/M]·Tc.

If the correlation is calculated between the received spreading code B and the combined spreading code A, which is obtained by combining M-number of phase-delayed reference spreading codes $A_1$–$A_M$ as set forth above, the time needed for phase detection is $N^2$·Tc/M. Thus, the time required for detection is shortened to 1/M that of the conventional sliding correlator.

If C represents the spreading code, N the code length and M the number of codes combined, then a linear combined code S will be given by the following equation:

$$S_1 = \Sigma w_j C_{i+\phi(j)} \quad i=1\sim N \qquad (1)$$

where $\omega_j$ represents the weighting coefficient of a jth code to be added and $\phi(j)$ represents the amount of phase shift of the jth code to be added. In a case where correlation detection is performed using Si in Equation (i) as the combined spreading code, a correlation output value proportional to $\omega_j$ is obtained with respect to the code phase of $\phi(j)$. As a result, a correlation output with regard to M-number of code phases can be obtained by a single correlation detection operation.

(c) Second Embodiment of Correlator

Figure 4:
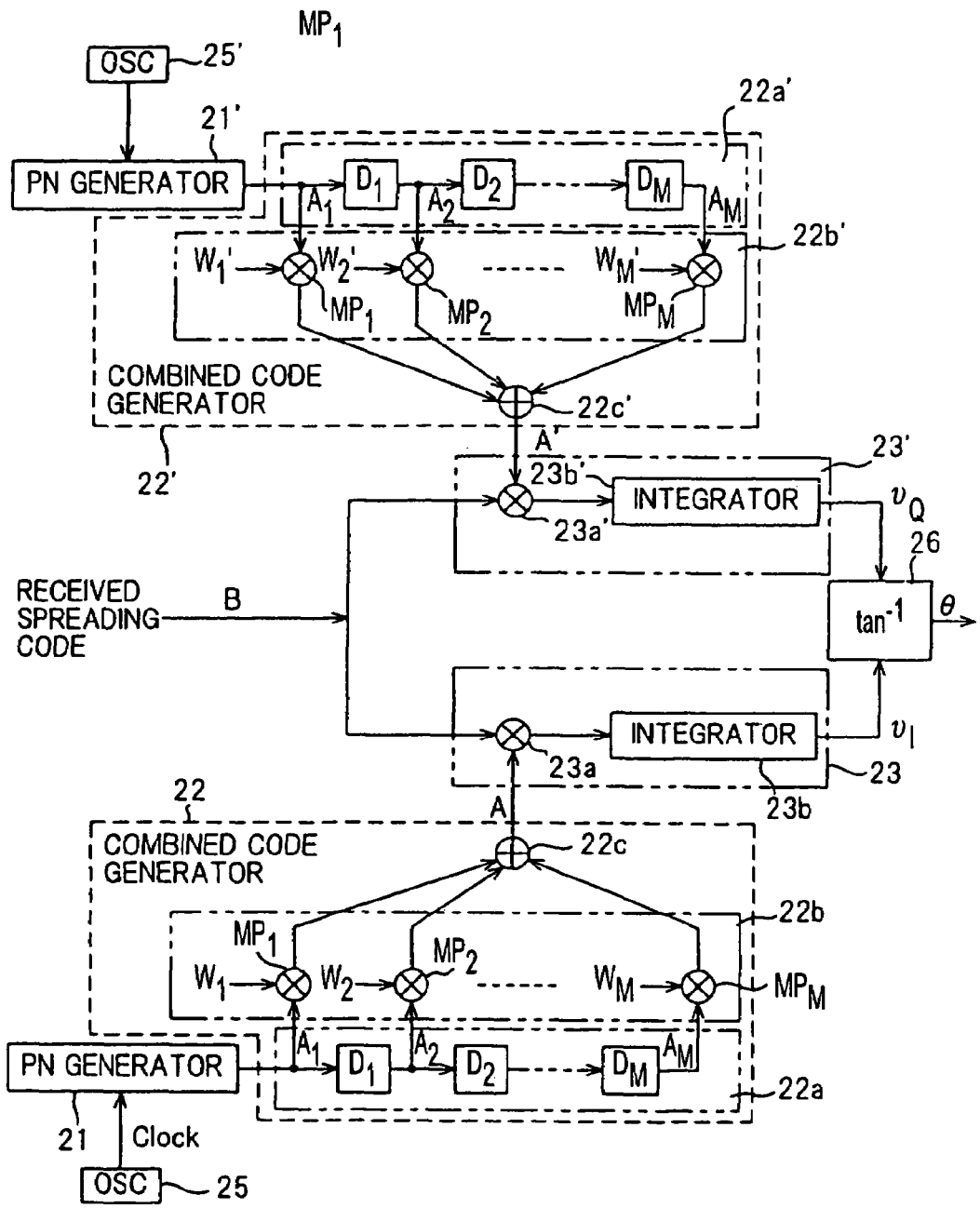
FIG. 4 is a diagram showing a second embodiment of the correlator according to the present invention.

FIG. 4 shows a second embodiment of the correlator according to the present invention, in which components identical with those of the first embodiment shown in FIG. 3 are designated by like reference characters. In the second embodiment, two correlators in accordance with the first embodiment are provided and a phase difference $\theta$ between the received spreading code and reference spreading code (the phase of the received spreading code) is detected using the output of each correlator.

Reference numerals 21, 21' designate identical first and second PN sequence generators for cyclically generating PN sequences (reference spreading codes) as M sequences. Each PN sequence has a code length of N chips, where the chip width is Tc. The code period (N·Tc) of each PN sequence is equal to one symbol period T. Combined code generators 22, 22' each weight and combine a plurality (M in the illustration) of phase-shifted reference spreading code sequences $A_1$–$A_M$.

Further, first and second arithmetic circuits 23, 23' calculate the correlations between combined spreading code A, A', respectively, and the received spreading code B. Oscillators 25, 25' output clocks having the chip frequency. A third arithmetic circuit 26 calculates the phase difference $\theta$ using correlation values output by the first and second arithmetic circuits 23, 23'. The first and second combined code generators 22, 22' include phase shift circuits 22a, 22a', weighting circuits 22b, 22b' and combining circuits 22c, 22c', respectively.

Figure 5A:
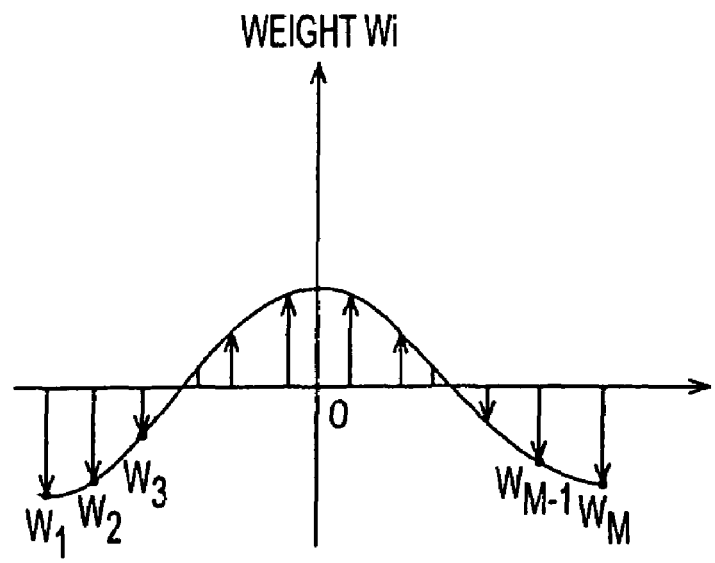
FIG. 5 is a diagram showing the operation of the correlator of FIG. 4.

The phase shift circuit 22a of the first combined code generator 22 has delay elements $D_1$–$D_M$ each of which successively delays the PN sequence by (N·Tc/M). The weighting circuit 22b includes multiplication circuits $MP_1$–$MP_M$ for weighting the $1^{st}$–Mth reference spreading codes as $A_1$–$A_M$, which are output by the phase shift circuit, by the weights $w_1$–$w_M$, respectively. The combining circuit 22c combines the weighted $1^{st}$–Mth reference codes and outputs the combined spreading code A. The weights $w_1$–$w_M$ are obtained by successively sampling one period (=N·Tc) of a cosine-wave signal at the units (N·Tc/M) at which the phase of the reference spreading code is shifted. FIG. 5(a) illustrates the weights in a case where sampling is carried out at the period of N·Tc/M, ex., at the chip period Tc, where M=N holds.

Figure 5B:
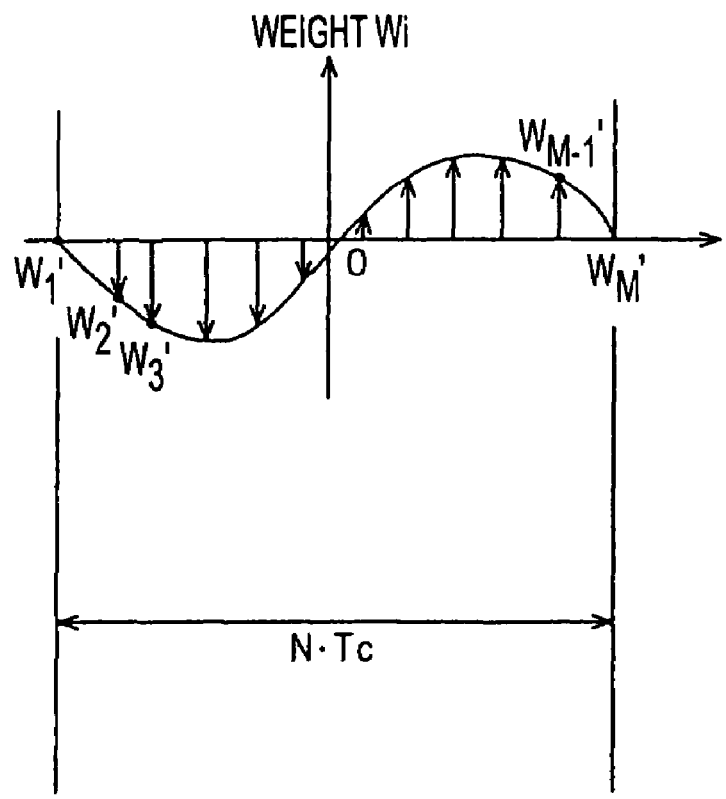

The phase shift circuit 22a' of the second combined code generator 22' has delay elements $D_1$–$D_M$ each of which successively delays the PN sequence by (N·Tc/M). The weighting circuit 22b' has the multiplication circuits $MP_1$–$MP_M$ for weighting the $1^{st}$ through Mth reference spreading codes $A_1$–$A_M$, which are output by the phase shift circuit, by weights $w_1'$–$w_M'$, respectively. The combining circuit 22c' combines the weighted $1^{st}$ through Mth reference codes and outputs the combined spreading code A'. The weights $w_1'$–$w_M'$ are obtained by successively sampling one period (=N·Tc) of a sine-wave signal at the units (N·Tc/M) at which the reference spreading code is shifted. FIG. 5(b) illustrates the weights in a case where sampling is carried out at the period of N·Tc/M, ex., the sampling is carried out at the chip period Tc, where M=N holds.

In a case where M=N holds, the first combined code generator 22 outputs a combined spreading code $U_I(i)$ indicated by the following equation:

$$\upsilon_I(i) = \Sigma PN(i+j) \times \cos(2\pi j/N) \quad (2)$$

where j=–N/2–N/2 holds.

The second combined code generator 22' outputs a combined spreading code $\upsilon_Q(i)$ indicated by the following equation:

$$\upsilon_Q(i) = \Sigma PN(i+j) \times \sin(2\pi j/N) \quad (3)$$

where j=–N/2–N/2 holds.

The first arithmetic circuit 23 multiplies the combined spreading code $\upsilon_I(i)$ by the received spreading code. Further, the first arithmetic circuit 23 cumulatively adds (integrates) the results of multiplication over one period (=N·Tc) of the reference spreading code. Similarly, the second arithmetic circuit 23' multiplies the combined spreading code $\upsilon_Q(i)$ by the received spreading code, and cumulatively adds (integrates) the results of multiplication over one period of the reference spreading code.

Figure 6:
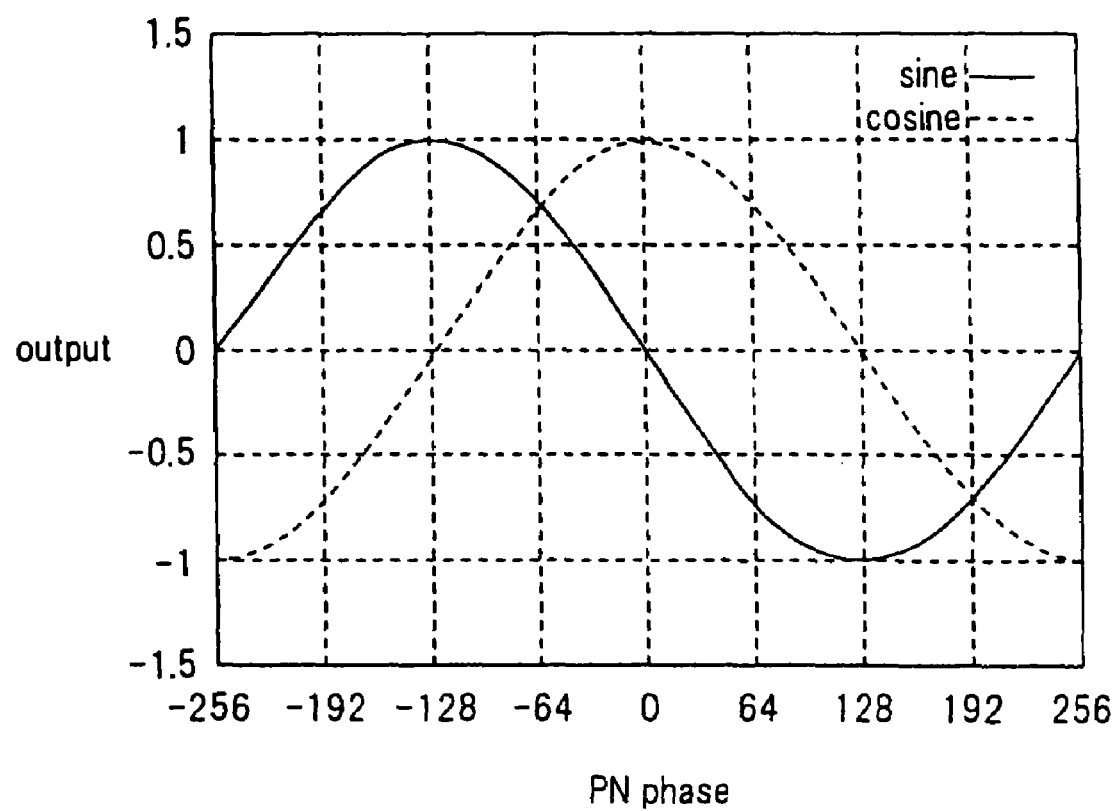
FIG. 6 is the output of a correlation detector.

FIG. 6 illustrates the output characteristics of the first and second arithmetic circuits 23, 23' in a case where the received spreading code B is multiplied by the combined spreading codes A, A', where the results are cumulatively added (integrated) over one period of the reference spreading code. From this cos, –sin characteristics are obtained with respect to all phases (N=–256 to 256) of the code. As a result, a third arithmetic circuit 26 uniquely decides and outputs the phase difference $\theta$ (the phase of the reference spreading code) between the received spreading code and reference spreading code from the results $\upsilon_I$, $\upsilon_Q$ of integration, where $\theta$ is given by the following equation:

$$\theta = -\tan^{-1} \upsilon_Q / \upsilon_I \quad (4)$$

In other words, the code phase $\theta$ is obtained by integrating over one period (=N·Tc) of the reference spreading code. Thus, the amount of time needed is significantly shortened in comparison with the conventional sliding correlator, which requires a length of time equivalent to $N^2$·Tc.

In addition, the scale of the circuitry is much smaller than that of a matched filter. It should be noted that if delayed waves are present, it may be necessary to adopt an arrangement in which the vicinity of the obtained phase difference $\theta$ is searched using a sliding correlator. In this case, however, the time needed for synchronization can be shortened in comparison with the conventional sliding correlator, which sequentially scans all code phases.

The PN sequence generators 21, 21' of FIG. 4 can be combined into a single common PN generator. The same is true for the phase shift circuits 22a, 22a' and oscillators 25, 25'.

(d) Third Embodiment of Correlator

Figure 7A:
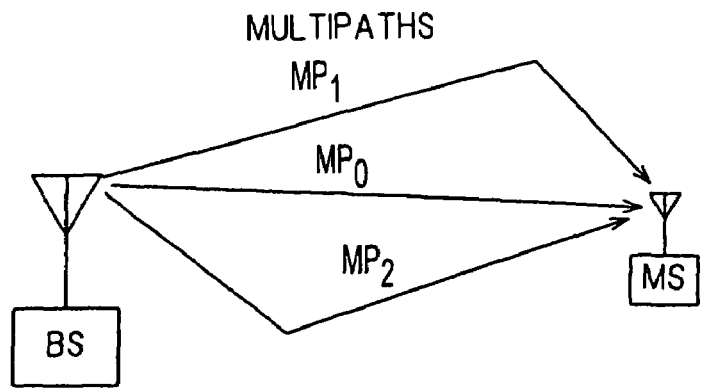
FIG. 7 is a diagram illustrating a third embodiment of the correlator according to the present invention.
Figure 7B:
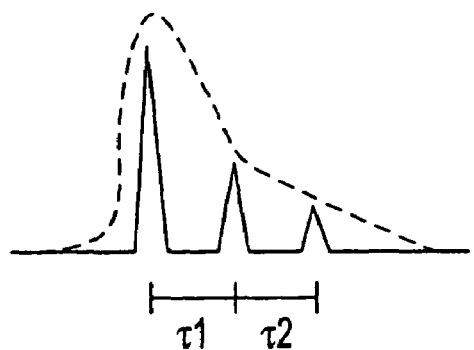
Figure 7C:
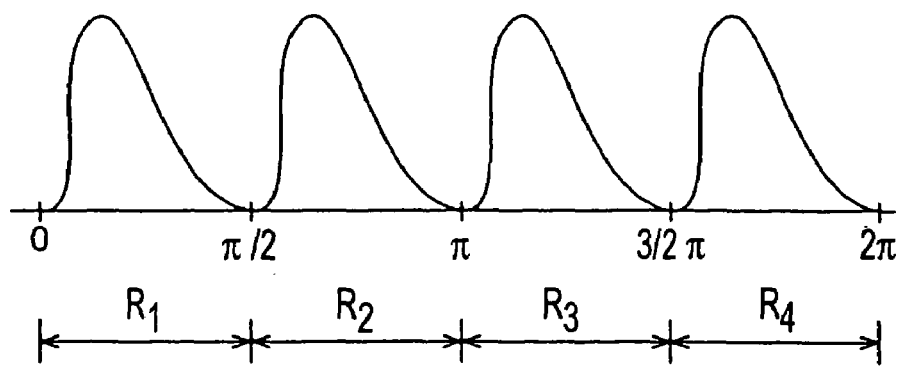

In mobile communications, multiple paths exist. As shown in (a) of FIG. 7, transmitted signals from a base station BS arrive at a mobile station MS successively via multipaths MP0, MP1, MP2 with delay times $\tau_1$, $\tau_2$, as illustrated in (b) of FIG. 7. These multipath signals constitute noise in phase detection and are obstacles to accurate detection of code phase $\theta$ in the second embodiment. Multipath signals, however, can be dispersed within a certain range of phases.

Accordingly, in the third embodiment, the phase difference $\theta$ is detected roughly in units of ($\tau/2$) using 4, for example, as M of the second embodiment. This enables phase areas R1–R4 [FIG. 7(c)] in which the true phase difference resides are discriminated, and the interiors of the phase areas are searched sequentially by a sliding correlator to obtain the phase difference for which the maximum correlation is obtained. It this arrangement is adopted, phase difference can be detected accurately even if multipaths exist.

Figure 8:
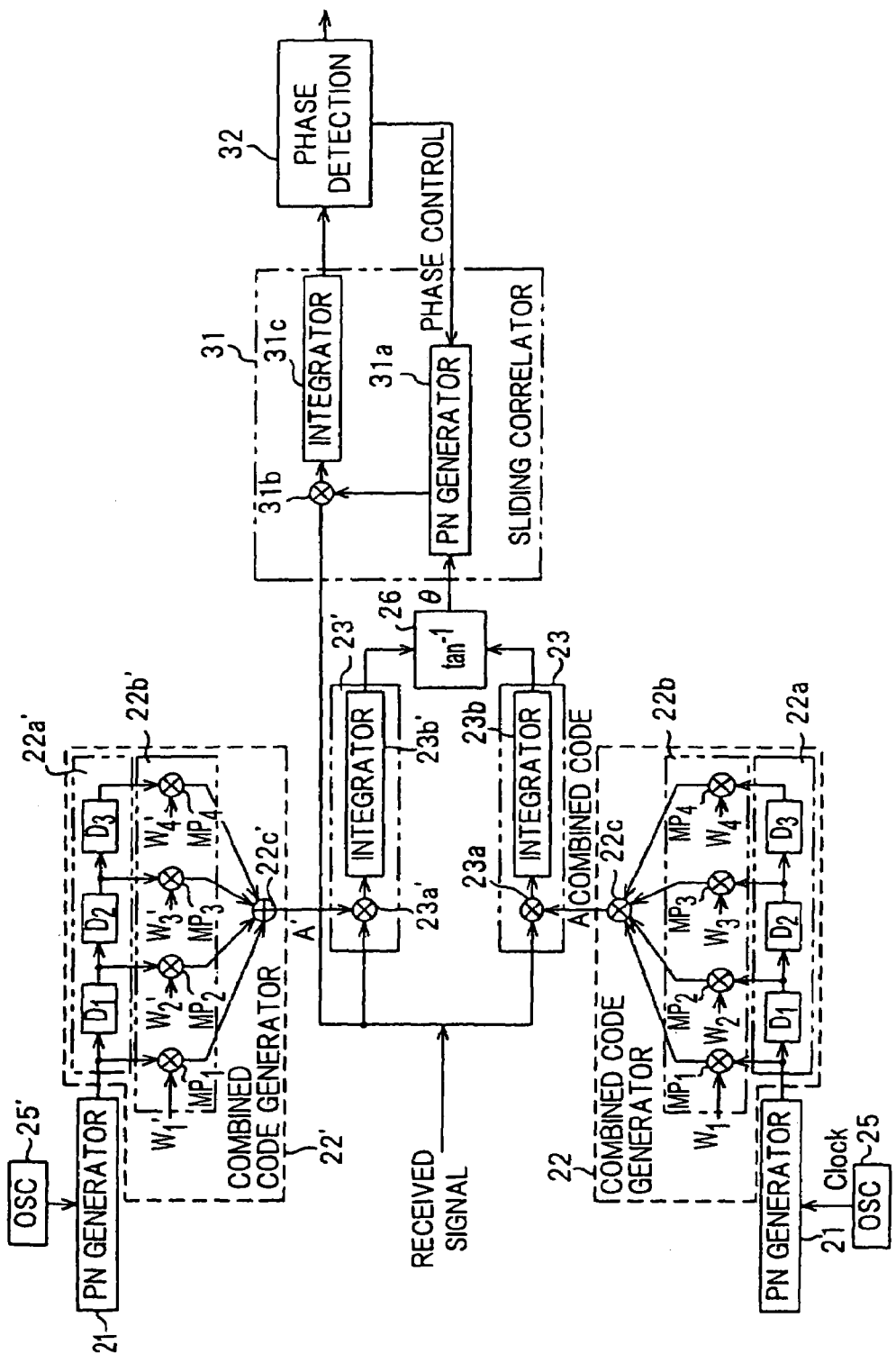
FIG. 8 is a diagram showing the third embodiment of the correlator according to the present invention.

FIG. 8 shows the third embodiment of the correlator according to the present invention, in which components identical with those of the second embodiment are designated by like reference characters. The third embodiment differs from the second embodiment in that (1) a sliding correlator 31 is provided on the output side of the third arithmetic circuit 26; (2) a phase detection circuit 32 is provided for detecting the phase for which the correlation value output by the sliding correlator is maximized; and (3) M=4 is used for the correlator of the third embodiment.

The phase shift circuit 22a of the first combined code generator 22 has delay elements $D_1$–$D_3$ each of which successively delays the PN sequence by (N·Tc/4). The weighting circuit 22b has multiplication circuits $MP_1$–$MP_4$ for weighting the first through fourth reference spreading codes a1 for weighting the first through fourth reference spreading codes $A_1$–$A_4$, which are output by the phase shift circuit, by the weights $w_1$–$w_4$, respectively. The combining circuit 22c combines the weighted first through fourth reference codes and outputs the combined spreading code A. The weights $w_1$–$w_4$ are obtained by successively sampling one period (=N·Tc) of a cosine-wave signal at the units (N·Tc/4) at which the phase of the reference spreading code is shifted. Here $w_1=\cos 0$, $w_2,=\cos(\pi/2)$, $W_3-\cos(2\pi/2)$, $w_4=\cos(3\pi/2)$ holds.

The phase shift circuit 22a' of the first combined code generator 22' has delay elements $D_1$–$D_3$ each of which successively delays the PN sequence by (N·Tc/4). The weighting circuit 22b' has multiplication circuits $MP_1$–$MP_4$ for weighting the first through fourth reference spreading codes $A_1$–$A_4$, which are output by the phase shift circuit, by the weights $w_1'$–$w_4'$, respectively. The combining circuit 22c' combines the weighted first through fourth reference codes and outputs the combined spreading code A'. The weights $w_1'$–$w_4'$ are obtained by successively sampling one period (=N·Tc) of a sine–wave signal at the units (N·Tc/4) at which the phase of the reference spreading code is shifted. Here $w_1'=\sin 0$, $w_2'=\sin(\pi/2)$, $w_3'=\sin(2\pi/2)$, $w_4'=\sin(3\pi/2)$ holds.

The first combined code generator 22 outputs a combined spreading code $\upsilon_I(i)$ indicated by the following equation:

$$\upsilon_I(I)=\Sigma PN(i+(N/4)j)\times\cos j(\pi/2) \quad (5)$$

where j=0–3.

$$\upsilon_Q(I)=\Sigma PN(i+(N/4)j)\times\sin j(\pi/2) \quad (6)$$

where j=0–3.

The first arithmetic circuit 23 multiplies the combined spreading code $\upsilon_1(i)$ by the received spreading code and cumulatively adds (integrates) the results of multiplication over one period (=N·Tc) of the reference spreading code. The second arithmetic circuit 23' multiplies the combined spreading code $\upsilon_Q(i)$ and the received spreading code and cumulatively adds (integrates) the results of multiplication over one period of the reference spreading code.

The third arithmetic circuit 26 obtains the phase difference (code phase) θ from $\upsilon_I$, $\upsilon_Q$ in accordance with Equation (4). As a result, in which of the M-number of areas a response resides is specified, where the M-number of areas are obtained by dividing all N code phases into M (=4) areas.

The sliding correlator 31 determines that the true code phase exists in an area Ri in which there is a response. The sliding correlator 31 then performs a search sequentially with respect to the phase of N/M-number of chips of the area Ri in a manner similar to that of the prior art. More specifically, the sliding correlator 31 generates the reference spreading code at the initial phase of the area Ri, calculates the correlation between this reference spreading code and the receiving spreading code, outputs one correlation value R(t) following one symbol period (=N·Tc) and shifts the phase of the reference spreading code by chip width. The sliding correlator 31 then outputs correlation values of N/M-number of different phases and, the phase detection circuit 32 finds the code phase for which the correlation value R(t) output by the sliding correlator 31 is maximized.

By virtue of the operation described above, the scanning of all code phases of N chips of one symbol can be completed in a time of $(N^2/M+N)$·Tc in accordance with the third embodiment. Thus, the amount of time needed is shortened greatly in comparison with the conventional sliding correlator, which requires a length of time equivalent to $N^2$·Tc.

(e) Fourth Embodiment of Correlator

In the first embodiment of FIG. 3, the arithmetic circuit 23 (1) outputs a correlation value of level $W_1$ if the phase of the received spreading code B matches the phase of the first reference spreading code $A_1$. Further, the arithmetic unit 23 (2) outputs a correlation value of level $W_2$ if the phase of the received spreading code B matches the phase of the second reference spreading code $A_2$ and (3) outputs a correlation value of level $W_M$ if the phase of the received spreading code B matches the phase of an Mth reference spreading code $A_M$.

Accordingly, when a phase area is divided into two portions, all weights $w_1$–$w_M$ of reference spreading codes $A_1$–$A_M$ for which the amounts of phase shift reside in the first phase area are made w (where w is an integer). Thus, all the weights $w_{m+1}$–$w_M$ of the reference spreading codes $A_{m+1}$–$A_M$ for which the amounts of phase shift reside in the second phase area are made –w (FIG. 9(a)). When this arrangement is adopted, the arithmetic circuit 23 outputs a correlation value of weight +W if the phase of the received spreading code B matches the phase of any one of the reference spreading codes $A_1$–$A_M$ and outputs a correlation value of weight –W if the phase of the received spreading code B matches the phase of any one of the reference spreading codes $A_{m+1}$–$A_M$.

As a result, the phase detection circuit 24 is capable of recognizing the phase area to which the code phase belongs depending upon whether the correlation value is +W or –W. The phase area to which the code phase belongs is then divided further into two portions, and similar weighting [FIG. 9(b)] and discrimination are carried out to narrow down the phase area. If these weighting and discrimination operations are repeated (FIGS. 9(c), (d)), the phase difference between the received spreading code and reference spreading code (namely the phase of the received spreading code) can eventually be detected. For example, as indicated by the hatched portions in FIGS. 9(a) through (d), the area in which the code phase actually resides in narrowed successively and matching of the phase of the received spreading code with the phase of the second reference spreading code can eventually be recognized. If the relation M=N holds, the method described above makes it possible to complete the scanning of all code phases of N chips by performing correlation detection $\log_2 N$ times.

Figure 10:
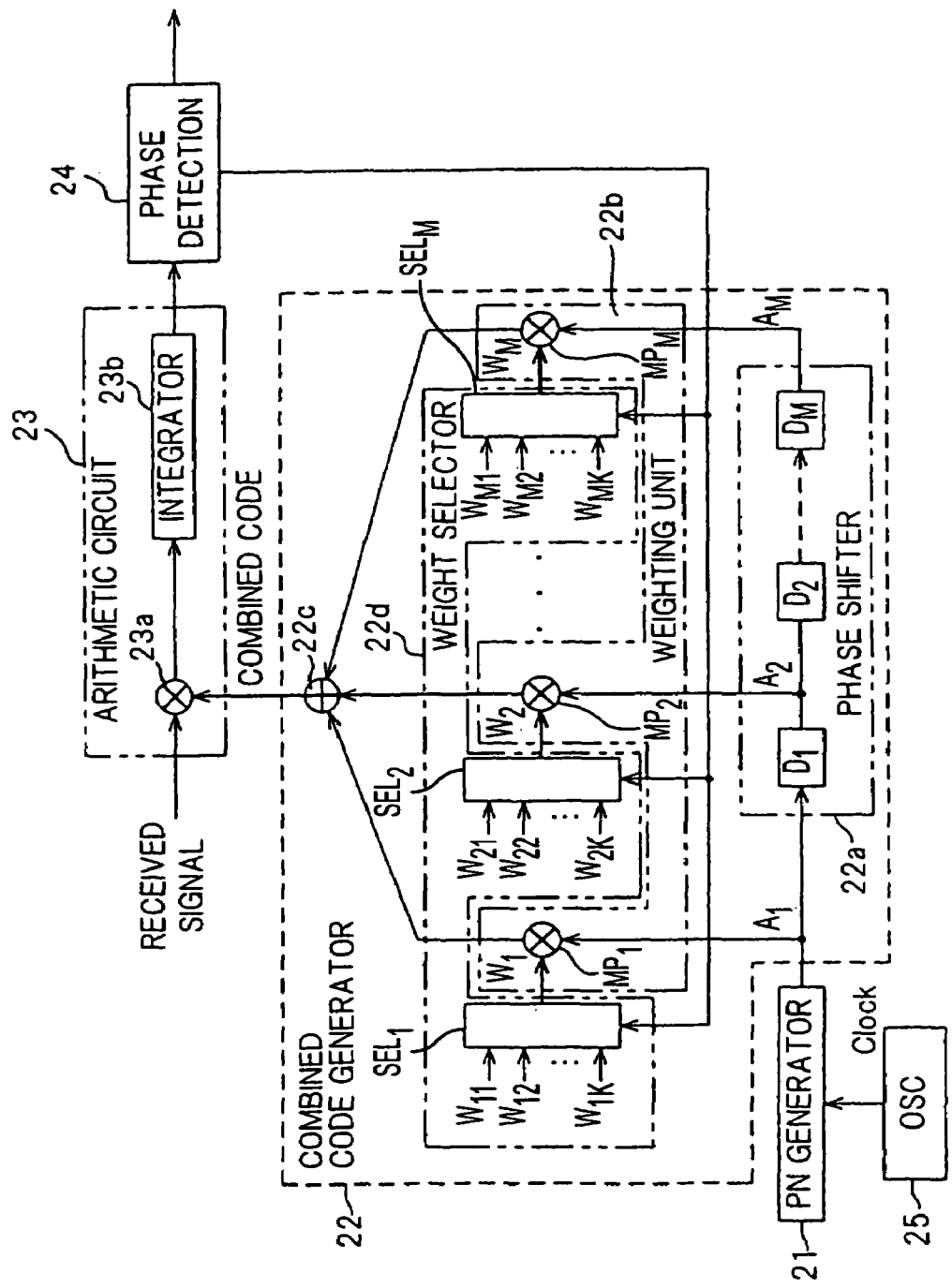
FIG. 10 is a diagram showing the fourth embodiment of the correlator according to the present invention.

FIG. 10 shows the fourth embodiment of the correlator of the present invention, in which components identical with those of the first embodiment shown in FIG. 3 are designated by like reference characters. This embodiment includes the PN sequence generator 21, the combined code generator 22, the arithmetic circuit 23, the phase detection circuit 24 and the oscillator 25 for outputting a clock having the chip frequency.

The combined code generator 22 includes the phase shift circuit 22a, the weighting circuit 22b, the combining circuit 22c and a weight selector 22d. The phase shift circuit 22a has delay elements $D_1$–$D_M$ for successively delaying the PN sequence, which is the reference spreading code, (N·Tc/M) at a time. The weighting circuit 22b has multiplication circuits $MP_1$–$MP_M$ for weighting the $1^{st}$–Mth reference spreading codes $A_1$–$A_M$, which are output by the phase shift circuit, by weights $w_1$–$w_M$, respectively. The combining circuit 22c combines the weighted $1^{st}$–Mth reference spreading codes and outputs the combined spreading code A.

Figure 9A:
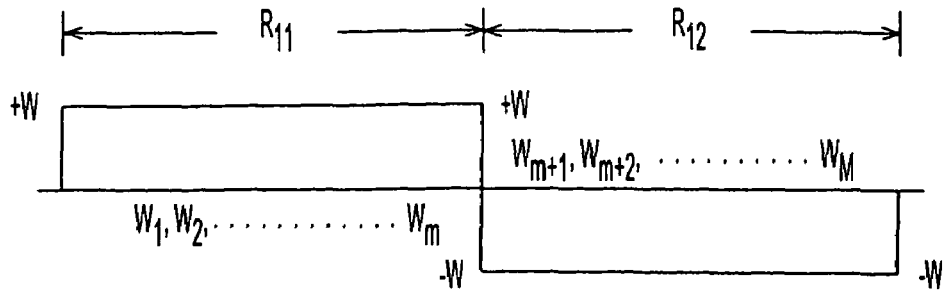
FIG. 9 is a diagram illustrating the principle of the correlator according to a fourth embodiment of the present invention.

The weight selector 22d is provided with the following K sets of weight patterns in advance:

$$w_{11}, w_{21}, w_{31}, \ldots w_{M1},$$

$$w_{12}, w_{22}, w_{32}, \ldots w_{M2},$$

$$\ldots$$

$$w_{1K}, w_{2K}, w_{3K}, \ldots w_{MK},$$

and changes weight patterns successively whenever identification of which of the two divided phase areas a code phase belongs to is completed, thereby eventually identifying the code phase. If N=512 and M=N holds, then K=9 and nine sets of weight patterns are provided. As shown in FIG. 9(a), the first weight pattern is one in which the weights $w_1$–$w_m$ of m (=M/2) reference spreading codes are made positive and constitute the first half of the successively phase-shifted M (=N) reference spreading codes. The weights $w_{m+1}$–$w_M$ of M/2 reference spreading codes are made negative and constitute the second half of the successively phase-shifted M (=N) reference spreading codes. The second and third weight patterns are the patterns shown in FIGS. 9(b) and 9(c), respectively, and the last or ninth weight pattern is one in which +w and −w alternate.

The arithmetic circuit 23 includes the multiplication circuit 23a for multiplying the received spreading code B, by the combined spreading code A and the integrator 23b for adding the results of multiplication N times and outputting the resulting correlation value. The phase detection circuit 24 monitors the correlation value (the correlation value of one period of the reference spreading code) that prevails after N additions, discriminates the area to which the code phase belongs depending upon whether the correlation value is +W or −W, and causes the weight selector 22d to select the weights of the next group.

Initially selectors $SEL_1$–$SEL_M$ of the weight selector 22d select the weight pattern of FIG. 9(a) and input the pattern to the multipliers $MP_1$–$MP_M$, respectively. The arithmetic circuit 23 outputs a correlation value of +W if the code phase is present in the initial phase area $R_{11}$ [FIG. 9(a)] and outputs a correlation value of −W if the code phase is present in the other phase area $R_{12}$. The phase detection circuit 24 identifies the phase area by the sign of the correlation value and then instructs the weight selector 22d to select the next weight pattern.

Figure 9B:
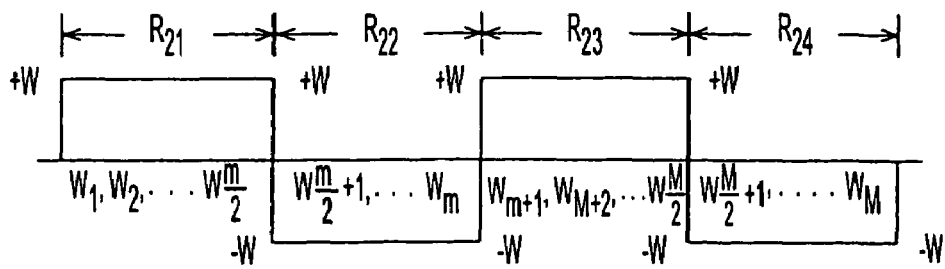
Figure 9C:
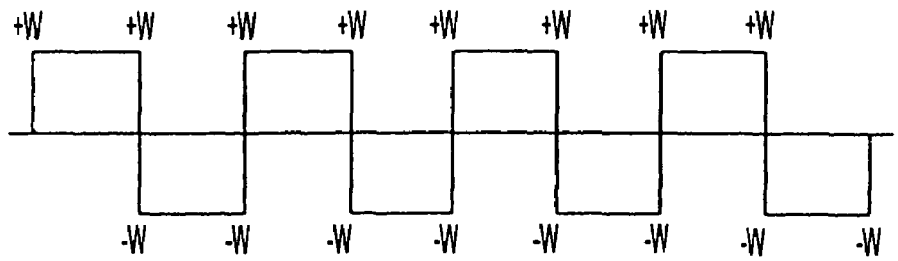
Figure 9D:
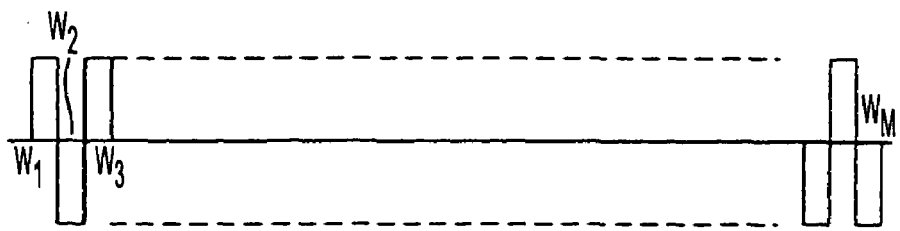

The weight selector 22d responds by selecting the weight pattern of FIG. 9(b) and inputs the pattern to the multipliers $MP_1$–$MP_M$ of the weighting circuit 22b. The arithmetic circuit 23 outputs the correlation value of +W if the phase difference resides in phase area $R_{21}$ or phase area $R_{23}$, and outputs the correlation value of −W if the phase difference resides in phase are $R_{22}$ or phase area $R_{24}$. When the phase detection circuit 24 identifies the phase area by sign of the correlation value, it instructs the weight selector 22d to select the next weight pattern. This operation is performed repeatedly to finally specify the area to which the code phase belongs.

Figure 11:
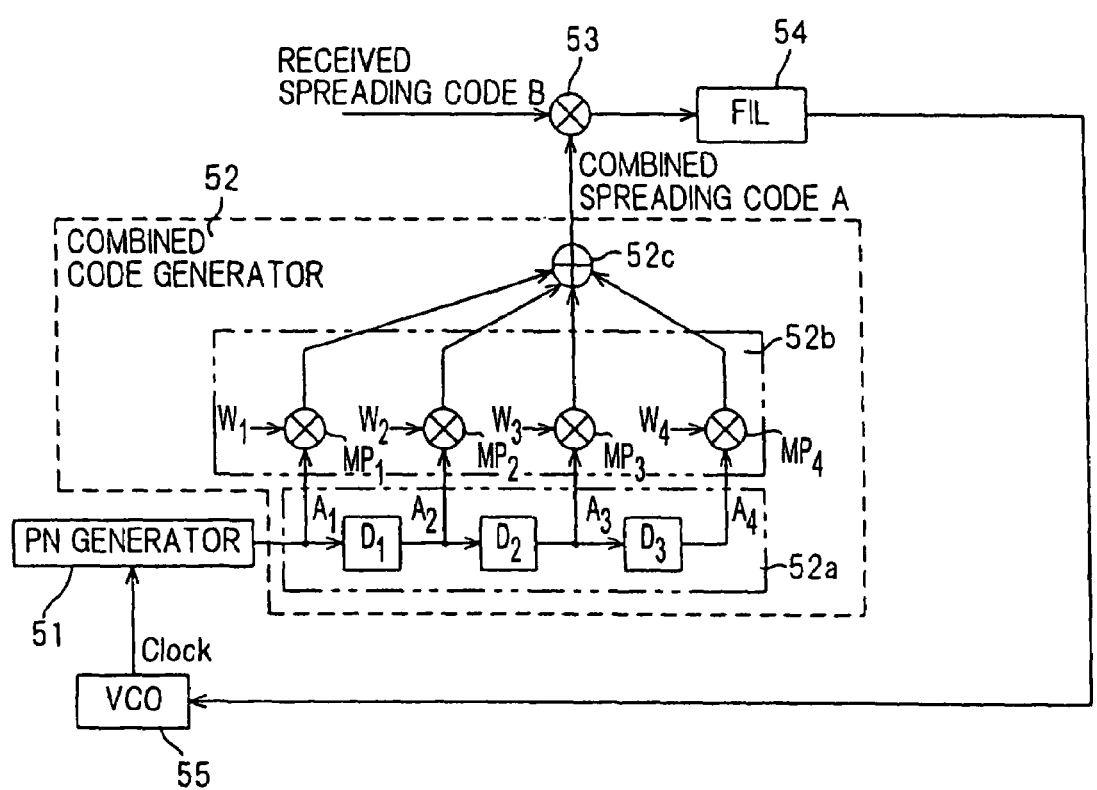
FIG. 11 is a diagram showing a first embodiment of a DLL circuit according to the present invention.

(B) DLL Circuit (a) FIG. 11 shows a first embodiment of a DLL circuit according to the present invention. Reference numeral 51 designates a PN sequence generator for cyclically generating a PN sequence (a reference spreading code) as an M sequence. The PN sequence has a code length of N chips, where the chip width is Tc. The code period (N·Tc) of the PN sequence is equal to one symbol period T.

A combined code generator 52 weights and combines a plurality (four) of phase-shifted reference spreading code sequences $A_1$–$A_4$. A multiplier 53 multiplies the combined spreading code A and the received spreading code B, chip by chip. A filter 54 subjects the output of the multiplier to filtering processing. A voltage-controlled oscillator (VCO) 55 is capable of varying the clock frequency (chip frequency) based upon the output of the filter to synchronize the reference spreading code with the received spreading code.

The combined code generator 52 includes a phase shift circuit 52a, a weighting circuit 52b and a combiner 52c. The phase shift circuit 52a has delay elements $D_1$–$D_3$ each of which successively delays the PN sequence that is the reference spreading code by one chip width Tc. The weighting circuit 52b includes multiplication circuits $MP_1$–$MP_4$ for weighting the first–fourth reference spreading codes $A_1$–$A_4$, which are output by the phase shift circuit, by weights $w_1$–$w_4$ ($w_1$=1.0, $w_2$=0.5, $w_3$=−0.5, $w_4$=−1.0), respectively.

The combiner 52c combines the weighted first-fourth reference spreading codes and outputs the combined spreading code A. The multiplier 53 and filter 54 calculate simultaneously the correlations between the reference spreading codes $A_1$–$A_4$ and the received spreading code B. The results of these calculations are then combined and output.

More specifically, the multiplier 53 and filter 54 calculate (1) the correlation between the first reference spreading code $A_1$ and the received spreading code, (2) the correlation between the second reference spreading code $A_2$ and the received spreading code, (3) the correlation between the third reference spreading code $A_3$ and the received spreading code, and (4) the correlation between the fourth reference spreading code $A_4$ and the received spreading code. These calculations are then combined and output.

Figure 12:
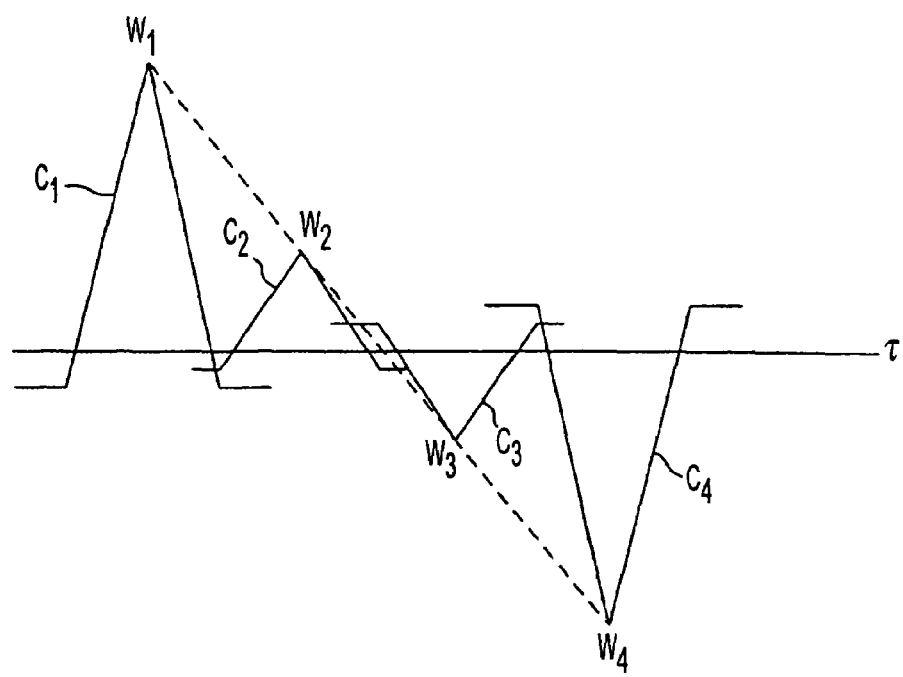
FIG. 12 is an output waveform for the DLL circuit of FIG. 11.
Figure 13:
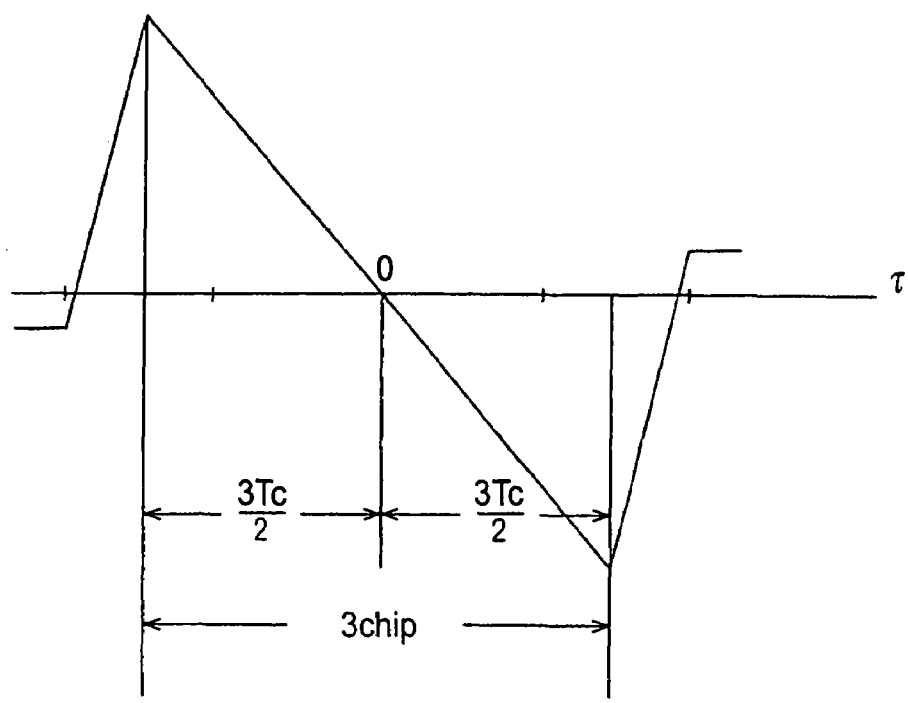
FIG. 13 is a filter output characteristic for the DLL circuit of FIG. 11.

Accordingly, if the phase of the received spreading code B matches the phases of each of the first–fourth reference spreading codes $A_1$–$A_4$, the filter 54 outputs the correlation values $C_1$–$C_4$ at the phase illustrated in FIG. 12 and therefore outputs a signal having the overall S-curve characteristic shown in FIG. 13. The phase synchronization acquisition range (lock range) is enlarged to the width of three chips, namely from −3Tc/2 to 3Tc/2, as evident from the S-curve.

The voltage-controlled oscillator 55 controls the clock frequency based upon the output of the low-pass filter in such a manner that the phase difference τ will become zero. For example, if the phase of the reference spreading code leads that of the received spreading code, control is performed so as to make the phase difference τ zero by lowering the clock frequency. If the phase of the reference spreading code lags behind that of the received spreading code, control is performed so as to make the phase difference τ zero by raising the clock frequency.

In accordance with the DLL circuit of FIG. 11, the lock range can be enlarged threefold in comparison with the conventional DLL circuit.

(b) Generalized Configuration

The first embodiment of the DLL circuit described above relates to a case where four reference spreading codes $A_1$–$A_4$ delayed in phase are combined upon being weighted by weights $w_1$–$w_4$, respectively, and the correlation between the combined spreading code and the received spreading code is calculated. If an arrangement is adopted in which this approach is expanded to combine M-number of phase-delayed reference spreading codes $A_1$–$A_M$ upon weighting them by weights $w_1$–$w_M$, respectively, and to calculate the correlation between the combined spreading code and the received spreading code, then the lock range can be enlarged by a factor of (M−1).

Figure 14:
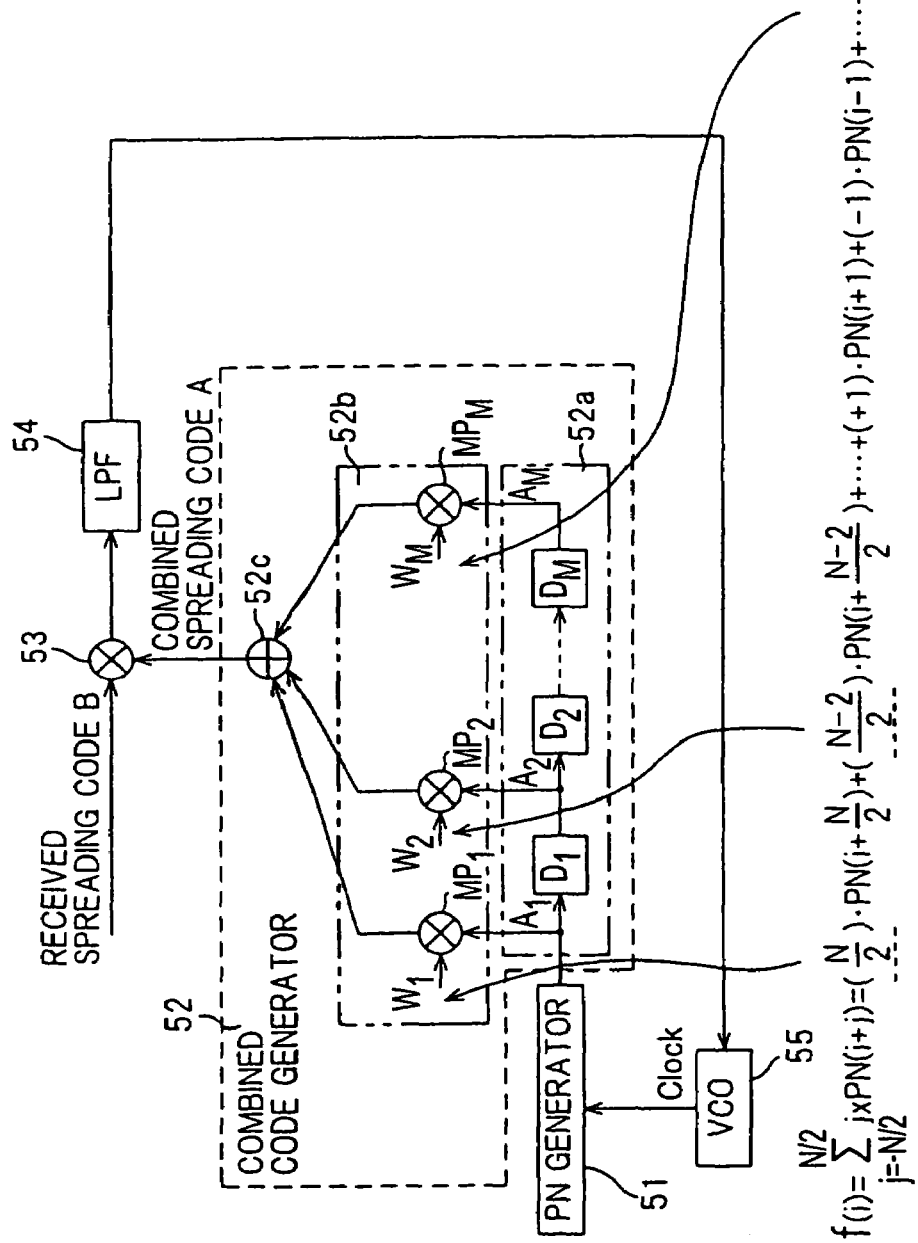
FIG. 14 is a diagram showing a generalized configuration of the DLL circuit according to the present invention.

FIG. 14 is a diagram showing the generalized configuration of the DLL circuit according to the present invention, in which components identical with those of the first embodiment shown in FIG. 11 are designated by like reference characters. The generalized configuration includes the PN sequence generator 51, the combined code generator 52, the multiplier 53, the low-pass filter 54 and the oscillator 55 for outputting the chip-frequency clock.

The combined code generator 52 includes the phase shift circuit 52a, the weighting circuit 52b and the combiner 52c. The phase shift circuit 52a includes M-number of delay elements $D_1$–$D_M$ each of which successively delays the PN sequence (the reference spreading code) by the chip width Tc. The weighting circuit 52b includes multiplication circuits $MP_1$–$MP_M$ for weighting the $1^{st}$–Mth reference spreading codes $A_1$–$A_M$, which are output by the phase shift circuit, by weights $w_1$–$w_M$, respectively. The combining circuit 52c then combines the weighted $1^{st}$–Mth reference codes and outputs the combined spreading code A.

The weights $w_1$–$w_M$ are determined in the following manner. The weights of M/2-number of reference spreading codes constituting the first half of the M-number of reference spreading codes successively shifted in phase are made positive and successively smaller. The weights of M/2-number of reference spreading codes constituting the second half of the M-number of reference spreading codes are made negative and successively larger. For example, when M=N holds, the following weights are adopted: $w_1$=N/2, $w_2$=(N/2)−1, $w_3$=(N/2)−2, . . . $w_{N/2}$=1, $w_{(N/2)+1}$=−1, $w_{(N/2)+2}$=−2, . . . $w_N$=−(N/2).

If weighting is performed in this manner, the combined code generator 52 will output a combined reference code f(i), which is indicated by the following equation, at a code phase of i·Tc:

$$f(i) = \Sigma j \times PN(i+j) \qquad (7)$$

where j=−N/2 to N/2.

Figure 15:
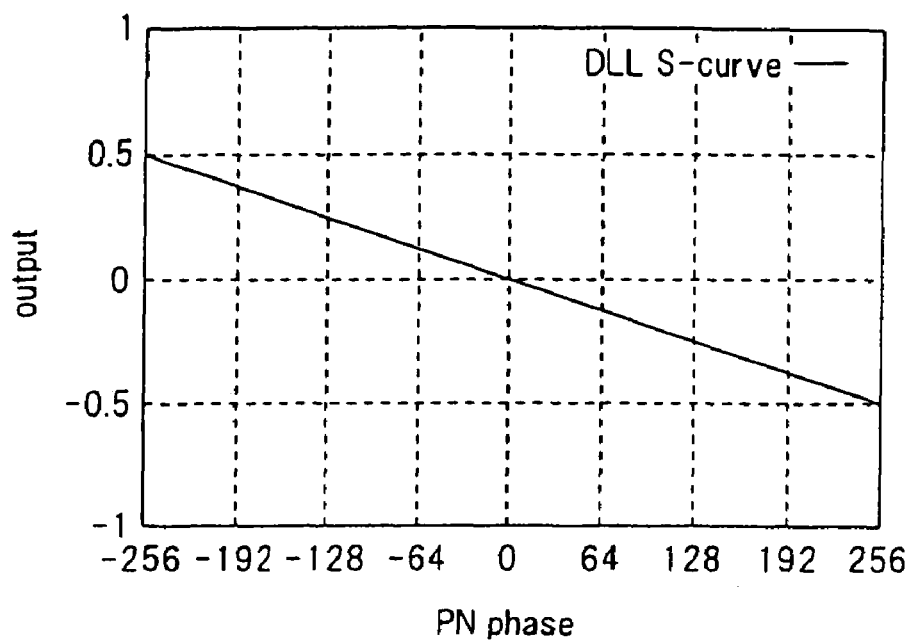
FIG. 15 is a diagram showing the S-curve of the DLL circuit of FIG. 14.

The multiplier 53 multiplies the combined reference code f(i) and the received spreading code B, chip by chip. The filter 54 subjects the output of the multiplier to a filtering process. The voltage-controlled oscillator 55 then controls the clock frequency based upon the output of the low-pass filter in such a manner that the phase difference τ becomes zero. If the reference spreading code has nine PN phases (where N=512), an S-curve characteristic shown in FIG. 15 is obtained in the DLL circuit. The input code phase (phase difference) is plotted along the horizontal axis in FIG. 15, and the normalized output level is plotted along the vertical axis. In accordance with the DLL circuit of FIG. 14, an output characteristic having a linear slope can be obtained for all phases of the code and thus initial synchronization acquisition is unnecessary.

Figure 16:
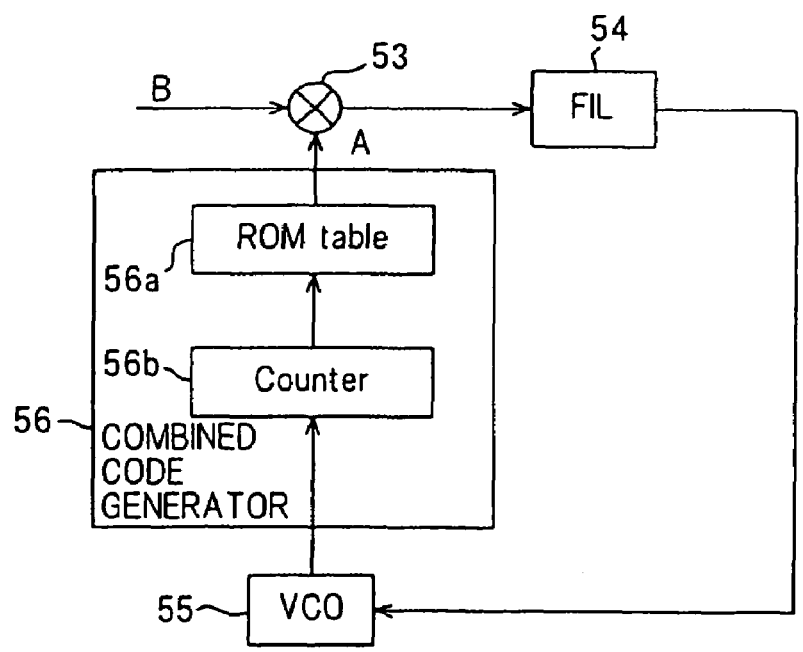
FIG. 16 is a diagram showing a table look-up DLL circuit.

FIG. 16 shows a table look-up DLL circuit. Reference numeral 56 designates a combined code generator, which has a counter and a ROM table that outputs the combined reference code f(i) indicated by Equation (7). The multiplier 53 multiplies the combined reference code A=f(i) and the received spreading code B, chip by chip. Reference numeral 54 designates the filter and 55 the voltage-controlled oscillator (VCO).

The combined code generator 56 has a ROM table 56a for storing the combined spreading code of Equation (7), and a counter 56b for generating a table address. The phase of the received spreading code and the phase of the reference spreading code are made to coincide by controlling the clock of the counter 56b by the voltage-controlled oscillator 55. The content of the ROM table 56a can be configured in various forms depending upon the weighting method. The S-curve characteristic in a case where a table in accordance with Equation (7) is used is as shown in FIG. 15, as described above.

(c) Second Embodiment of DLL Circuit

An advantage of the DLL circuit according to the first embodiment shown in FIG. 14 is that the lock range is enlarged if M is large. However, if the slope of the S-curve becomes more gentle, loop gain declines and achieving coincidence between the phases of the received spreading code and reference spreading code takes more time. Moreover, phase tends to fluctuate in response to external disturbances. On the other hand, if it is made smaller, then the lock range is reduced. However, the slope of the S-curve becomes extremely steep, loop gain can be enlarged and fluctuation of the phase in response to external disturbances diminishes.

Figure 17A:
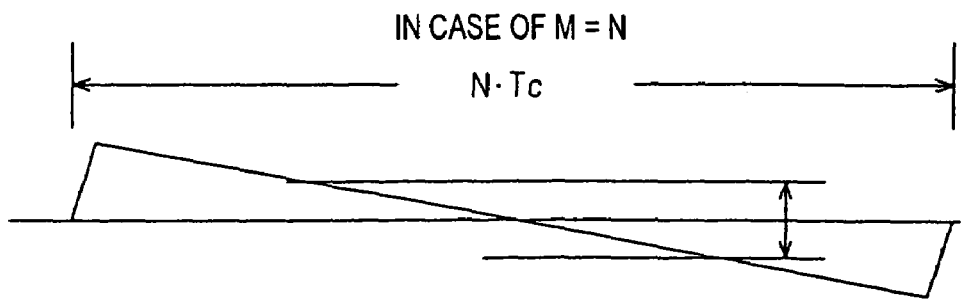
FIG. 17 is a diagram illustrating the operation of the DLL circuit according to the present invention.
Figure 17B:
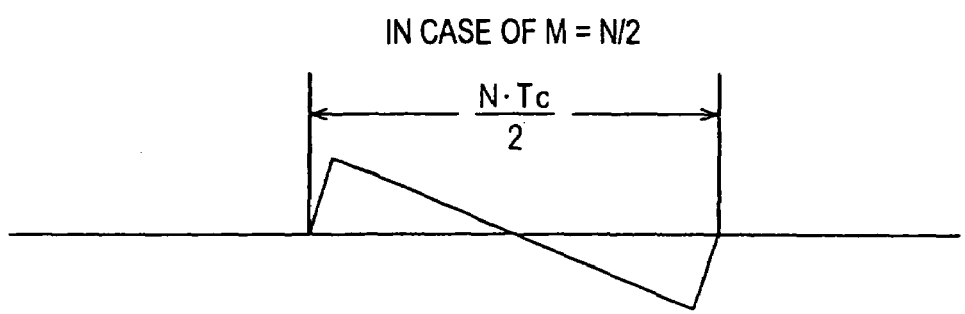
Figure 17C:
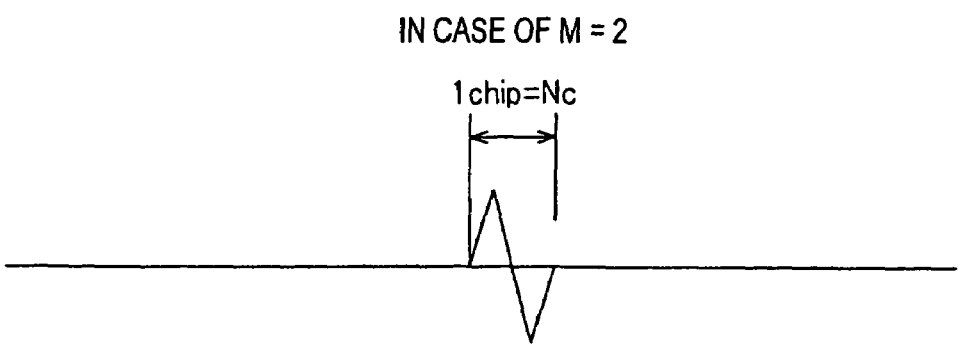

Accordingly, as shown in (a) of FIG. 17, M is enlarged initially and a synchronizing operation is performed. Thus, when a certain degree of synchronization has been achieved, the output level of the correlator declines. The output level is discriminated, M is reduced and a changeover is made to a linear combined code set including narrower range of phases, as shown in (b) of FIG. 17. If control is performed in similar fashion so as to gradually reduce M (FIG. 17(c)), synchronization can be achieved earlier and the slope of the S-curve with respect to phase is made much steeper. This makes it possible to raise the loop gain and to improve the characteristic of the DLL circuit.

Figure 18:
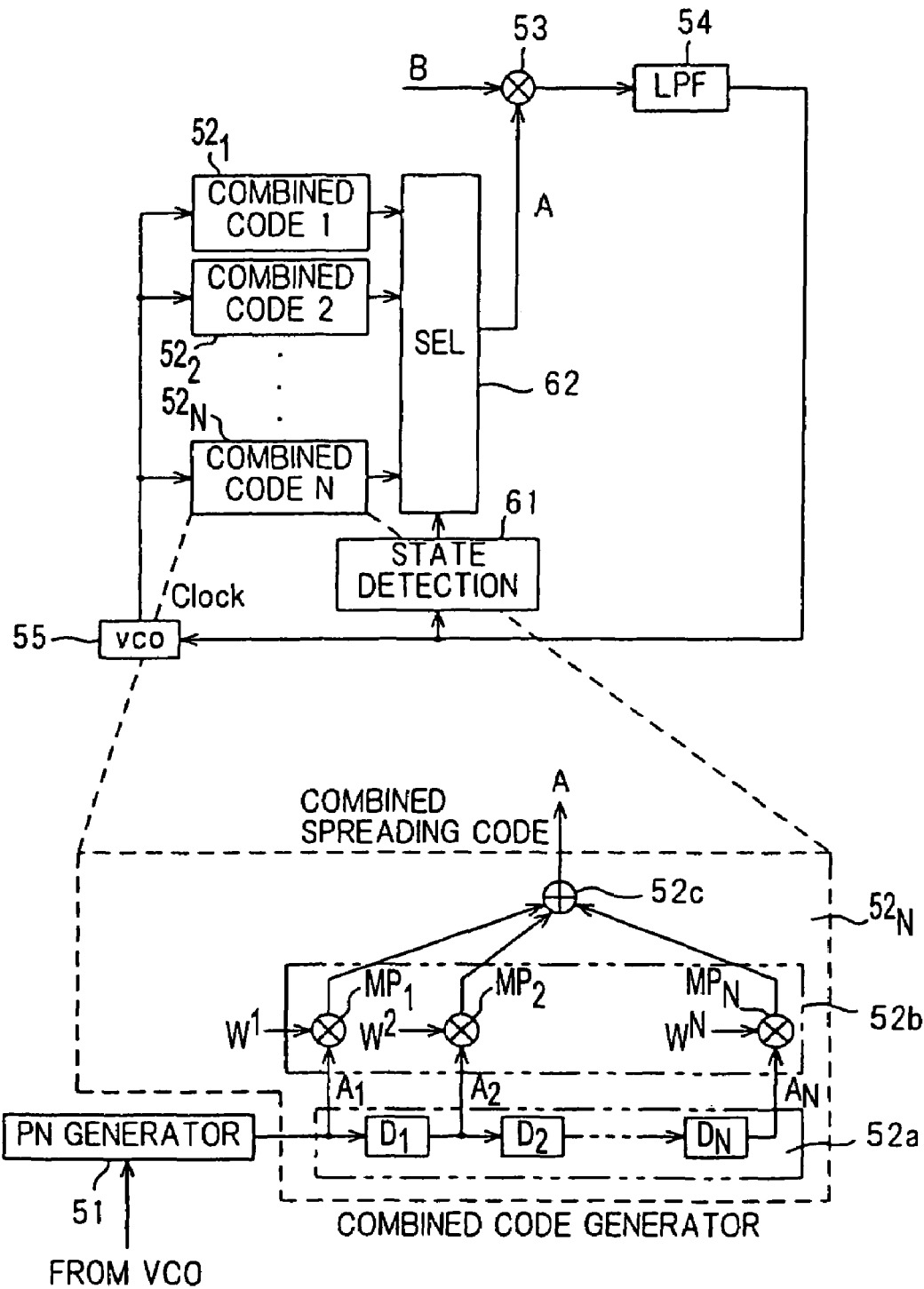
FIG. 18 is a diagram showing the second embodiment of the DLL circuit according to the present invention.
Figure 19:
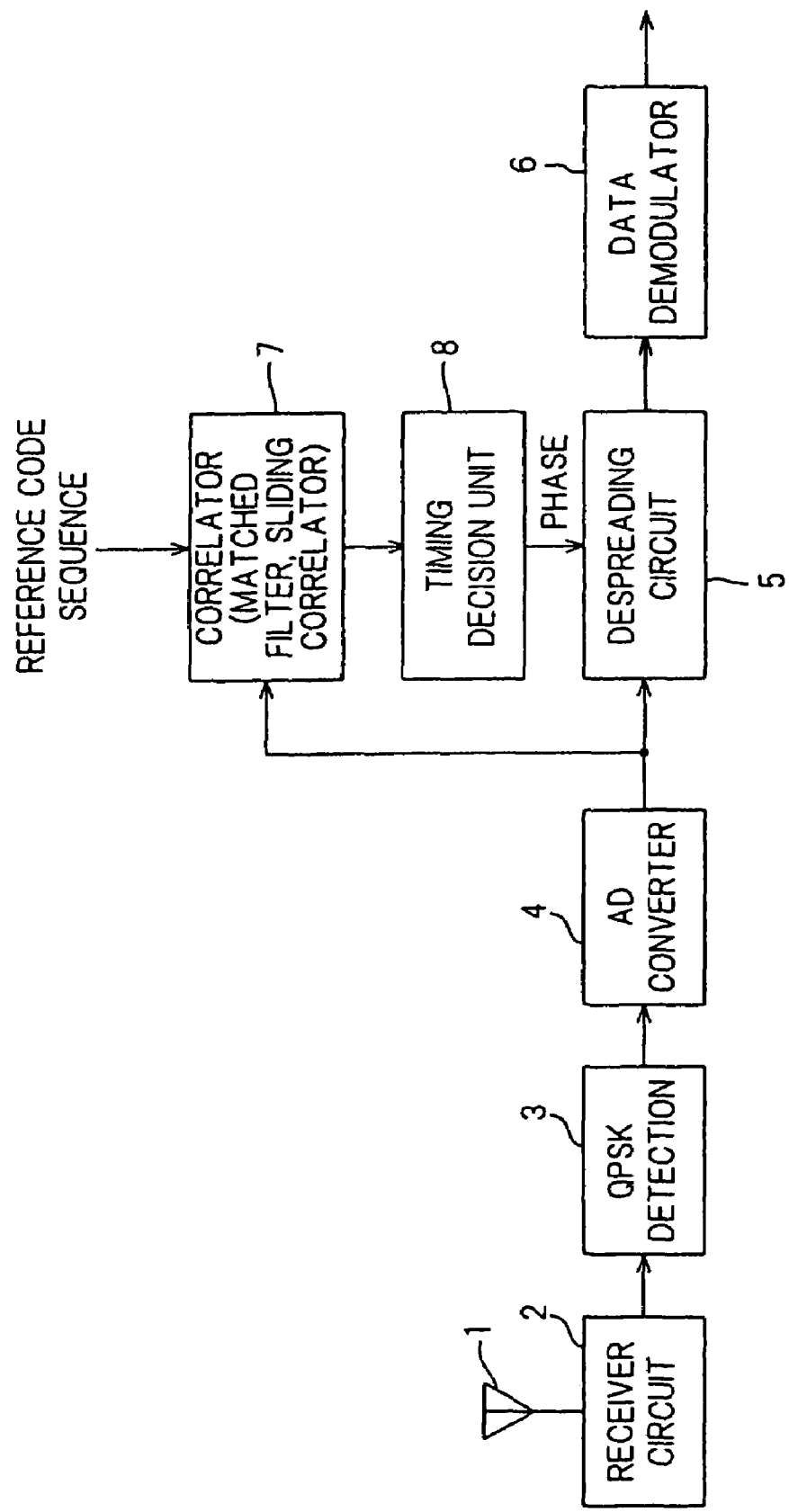
FIG. 19 is a diagram showing a receiver of a mobile station.
Figure 20:
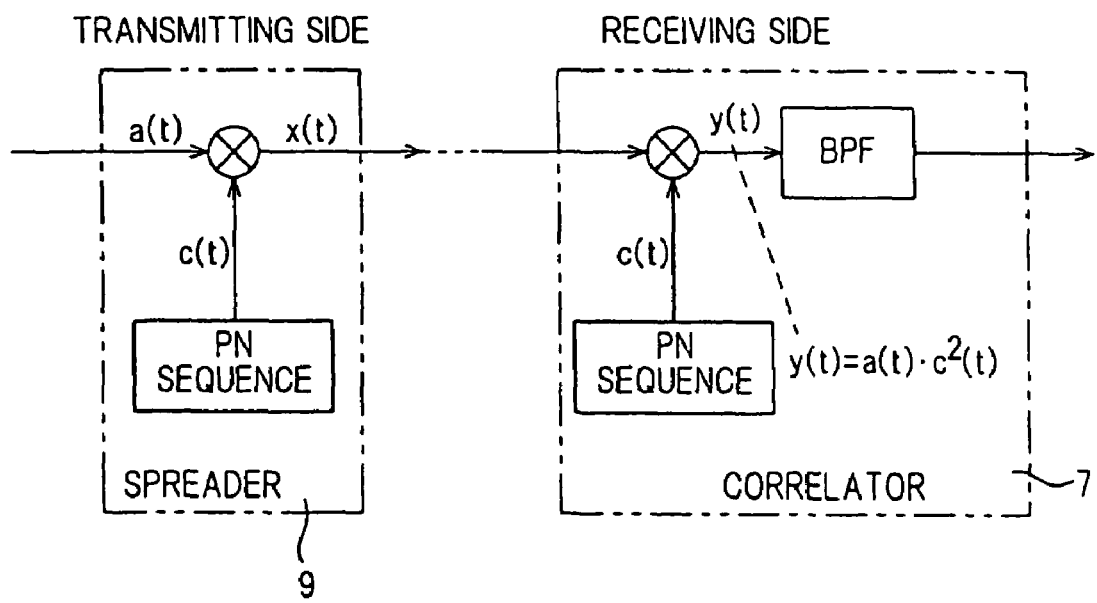
FIG. 20 is a diagram illustrating decision of spread start timing by a correlator.
Figure 21:
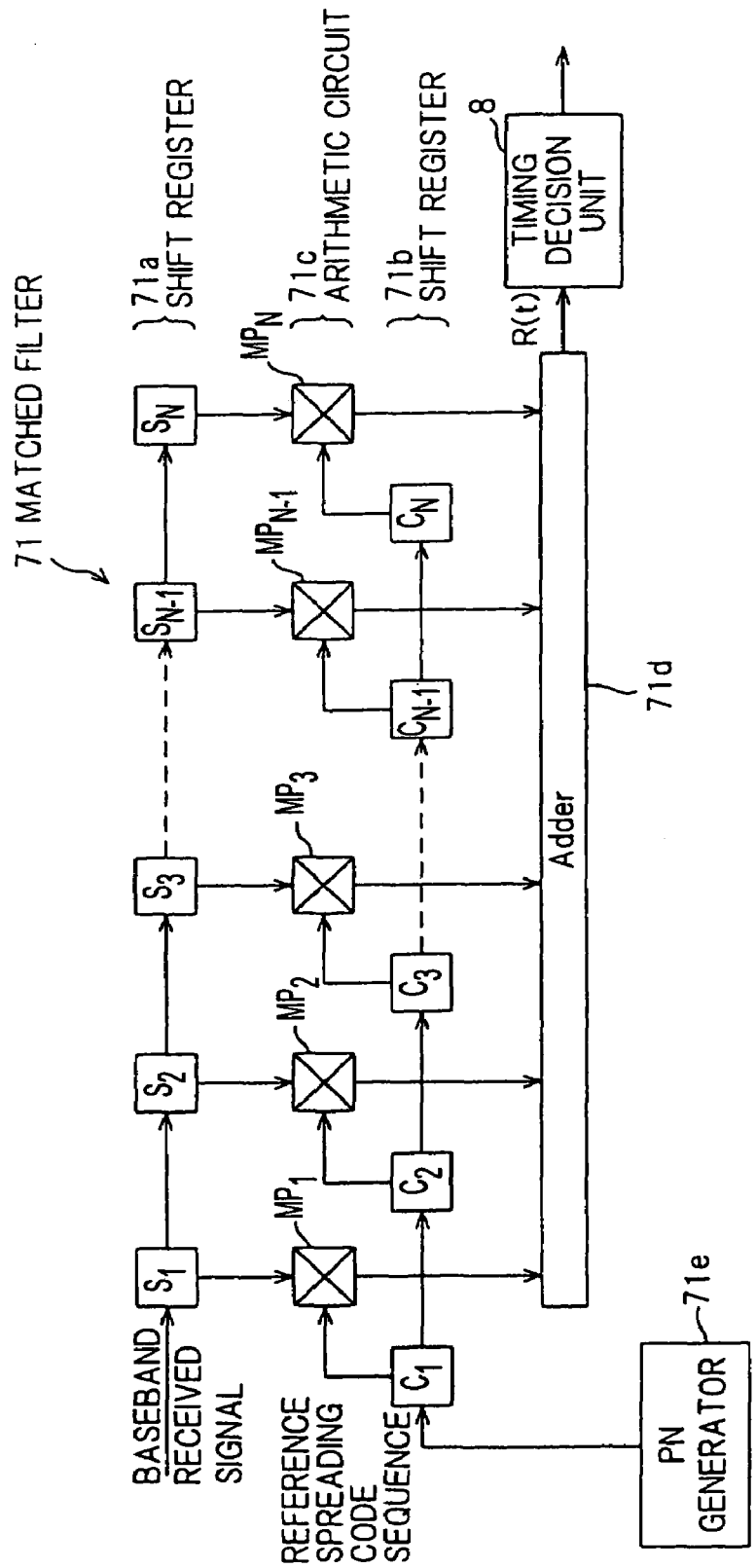
FIG. 21 is a diagram showing a matched filter.

FIG. 18 shows a second embodiment of the DLL circuit according to the present invention, in which components identical with those shown in FIG. 14 are designated by like reference characters. Reference numeral 51 designates the PN generator. Combined code generators $52_1$–$52_N$ generate combined spreading codes in a case where M=2, M=4, . . . , M=N hold, respectively. The multiplier 53 multiplies the combined reference code A and the received spreading code B chip by chip.

Reference numeral 54 denotes the filter and 55 the voltage-controlled oscillator. Reference numeral 61 designates a state detector for detecting a state in which the output of the low-pass filter falls below a set level when a certain degree of synchronization has been achieved. Further, reference numeral 62 designates a selector for selecting and outputting the next combined spreading code having a small M.

The configuration of the combined code generator $52_N$ is obtained when M in FIG. 14 is made equal to N. The weights $w_1$–$w_N$ are decided in a manner similar to that of FIG. 14. In particular, the weights of N/2-number of reference spreading codes of a small phase difference constituting the first half of the N-number of reference spreading codes successively shifted in phase are made positive and successively smaller. The weights of N/2-number of reference spreading codes of large phase difference constituting the second half of the N-number of reference spreading codes are made negative and successively larger.

Figure 25A:
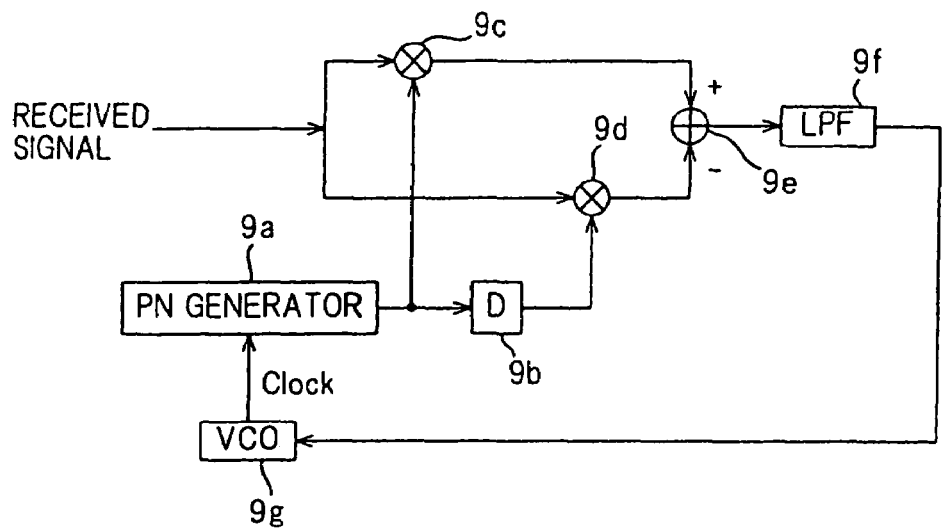
FIG. 25 is a diagram showing another conventional DLL circuit.
Figure 25B:
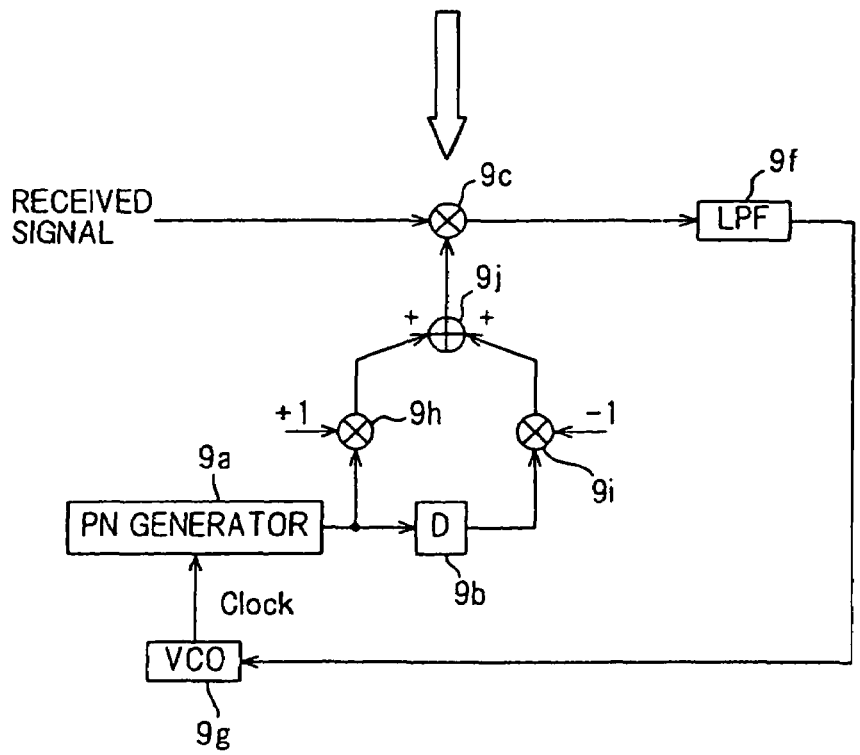

The combined code generator $52_2$ has a configuration identical with that of the combined code generator in the first embodiment shown in FIG. 11, and the combined code generator $52_1$ has a configuration identical with that of the conventional combined code generator, shown in FIG. 25(b), for which the lock range is one chip width Tc.

Initially, the selector 62 outputs a combined reference code, which is produced by the combined code generator $52_N$ for which M=N holds, and performs a synchronizing operation. The multiplier 53 multiplies the combined spreading code and the received spreading code B, chip by chip. The filter 54 subjects the output of the correlator to a filtering process and outputs the result. The voltage-controlled oscillator 55 controls the clock frequency based upon the output of the low-pass filter in such a manner that the phase difference τ becomes zero.

As a result, when a certain degree of synchronization is achieved and the filter output decreases, the state detector 61 instructs the selector 62 to select the next combined spreading code. In response, the selector 62 outputs a combined spreading code for which M=N/2 holds and performs a synchronizing operation. If control is subsequently performed in similar fashion in such a manner that M becomes gradually smaller, synchronization to within one chip will eventually be obtained.

Though the present invention has been described in accordance with embodiments thereof, the present invention can be modified in various ways in accordance with the gist thereof set forth in the claims and covers these modifications.

In accordance with the present invention, it is arranged that the phase difference between a received spreading code and a reference spreading code (the phase of the received spreading code) is detected using a combined spreading code obtained by weighting and combining a plurality (M-number) of reference spreading codes that have been shifted in phase. Accordingly, it is possible to obtain, by a single correlation operation, a response of a linear sum of correlation outputs with respect to the plurality (M-number) of code phases in the spreading code phase space. As a result, the time needed for the correlator to perform phase detection can be made smaller than that of a sliding correlator. Moreover, the scale of the circuitry is also made smaller than that of a matched filter.

Further, in accordance with the present invention, it is arranged that the phase difference between a received spreading code and a reference spreading code (the phase of the received spreading code) is detected using first and second combined spreading codes. The combined codes are obtained by subjecting a plurality of phase-shifted reference spreading codes to first and second weighting, and then combining the weighted codes. As a result, besides shortening phase detection time and reducing the scale of the circuitry, it is possible to detect phase correctly even if the reception level varies in dependence upon the state of reception.

Further, in accordance with the present invention, code phase is detected correctly by enlarging the units in which phase is shifted, obtaining the phase difference (code phase) between the received spreading code and reference spreading code at these phase-shift units and then sequentially searching the interior of a coarse phase area in the phase-shift units obtained by using a sliding correlator, for example. As a result, the time needed for the correlator to perform phase detection is made shorter than that of a sliding correlator. Moreover, the scale of the circuitry is also smaller than that of a matched filter.

Further, in accordance with the present invention, it is arranged to discriminate a phase area to which the phase difference between a received spreading code and reference spreading code (namely the code phase) belongs using a combined spreading code. The combined spreading code is obtained by weighting and combining a plurality of phase-shifted reference spreading code. Furthermore, weighting is changed and a smaller phase area is discriminated to which the code phase belongs, and to repeat this discrimination operation to narrow down the phase area. If this arrangement is adopted, the scanning of all code phases of N chips can be performed by a small number ($\log_2$N-number) of correlation operations.

In accordance with the present invention, it is arranged that phase is detected using a combined spreading code. The combined spreading code is obtained by weighting and combining a plurality of reference spreading codes that have been shifted in phase. Further, the phase of the reference spreading code is controlled using the results of phase detection. As a result, the phase synchronization acquisition range of a DLL can be enlarged to a code length of N chips and initial synchronization is achieved more quickly.

Further, in accordance with the present invention, the output level of the correlator declines when the DLL has achieved a certain degree of synchronization. This is discriminated and a changeover is made to the combined spreading code set to a narrower range of phases. As a result, the slope of the S-curve with respect to phase is made much steeper. This makes it possible to raise the loop gain of the DLL and to improve the phase control characteristic.

What is claimed is:

1. A delay locked loop circuit for maintaining phase synchronization between a received spreading code included in a spread-spectrum signal and a reference spreading code, comprising:

a reference spreading code generator for generating the reference spreading code;

a combined code generator for generating a combined spreading code by first weighting and then combining a plurality of phase shifted occurrences of the reference spreading code;

arithmetic means for detecting a phase difference between the received spreading code and the reference spreading code using the combined spreading code; and phase control means for controlling a phase of the reference spreading code on the basis of the phase difference, wherein the combined code generator makes positive, and successively reduces in magnitude, the weights of n-number of reference spreading codes of small phase shift constituting a first half of 2n-(where n is a positive integer) number of reference spreading codes that have been successively shifted in phase, and makes negative, and successively increases in magnitude, the weights of n-number of reference spreading codes of large phase shift constituting a second half of the reference spreading codes that have been successively shifted in phase.

2. The delay locked loop circuit of claim 1, wherein the arithmetic means includes a multiplier for multiplying the received spreading code by the combined spreading code, and filter for filtering an output of the multiplier.

3. The delay locked loop circuit of claim 1, said delay locked loop circuit providing a plurality of groups of weights for which the n is different, outputting a combined spreading code using a group of weights for which n is large, and outputting a combined spreading code using another group of weights for which n is small whenever the phase difference falls below a set value.

* * * * *